United States Patent [19]

Aso et al.

[11] Patent Number: 4,955,944
[45] Date of Patent: Sep. 11, 1990

[54] ROTATING ELECTRIC MACHINE

[75] Inventors: Hiroaki Aso; Yutaka Kitamura, both of Himeji, Japan

[73] Assignee: Mitsubishi Denki Kabushiki Kaisha, Tokyo, Japan

[21] Appl. No.: 275,172

[22] PCT Filed: Feb. 9, 1988

[86] PCT No.: PCT/JP88/00125
§ 371 Date: Oct. 6, 1988
§ 102(e) Date: Oct. 6, 1988

[87] PCT Pub. No.: WO88/06366
PCT Pub. Date: Aug. 25, 1988

[30] Foreign Application Priority Data

| Feb. 10, 1987 | [JP] | Japan | 62-28627 |
| Feb. 12, 1987 | [JP] | Japan | 62-30020 |
| Feb. 12, 1987 | [JP] | Japan | 62-30021 |
| Feb. 12, 1987 | [JP] | Japan | 62-30023 |
| Feb. 12, 1987 | [JP] | Japan | 62-30024 |
| Apr. 13, 1987 | [JP] | Japan | 62-91218 |
| Apr. 13, 1987 | [JP] | Japan | 62-91220 |
| Apr. 15, 1987 | [JP] | Japan | 62-93536 |

[51] Int. Cl.$^5$ ............ F01P 3/20; H02K 9/00
[52] U.S. Cl. ............ 123/41.31; 310/54
[58] Field of Search ............ 123/41.31, 2, 179 M, 123/179 D; 290/1 A, 2; 310/54, 58, 61, 68 D

[56] References Cited

U.S. PATENT DOCUMENTS

| 3,052,225 | 9/1962 | Kiekhaefer | 123/41.31 |
| 4,262,224 | 4/1981 | Kofink et al. | 310/54 |
| 4,295,067 | 10/1981 | Binder et al. | 310/58 X |
| 4,468,580 | 1/1984 | Sasaki et al. | 310/68 D X |
| 4,500,722 | 2/1985 | Ahner et al. | 219/209 |
| 4,739,204 | 4/1988 | Kitamura et al. | 123/41.31 X |
| 4,765,283 | 8/1988 | Kitamura et al. | 123/41.31 |
| 4,779,905 | 10/1988 | Ito et al. | 310/58 X |
| 4,818,906 | 4/1989 | Kitamura et al. | 310/54 X |
| 4,864,974 | 9/1989 | Aso | 123/41.31 |

FOREIGN PATENT DOCUMENTS 0086861 7/1981 Japan .
0054949 11/1986 Japan .

Primary Examiner—Willis R. Wolfe
Attorney, Agent, or Firm—Sughrue, Mion, Zinn, Macpeak and Seas

[57] ABSTRACT

An armature core 55 and field cores 53 of a vehicle starter/generator are directly mounted on the engine cylinder block, 57, and are cooled by the fluid circulating an coolant passageways 58–62 in the block. Heat pipes 76, 77 arranged on the armature core and/or the field cores may be inserted in the coolant passageways in the cylinder block, and a clutch 69 may be disposed between revolving-field poles 52 mounted on the engine crankshaft 50 and a transmission drive shaft 63.

26 Claims, 25 Drawing Sheets

ROTATING ELECTRIC MACHINE

FIELD OF THE INVENTION

This invention relates to a rotating electric machine such as an engine starting and charging device comprising as a unit a starting motor for starting an automotive engine and a charging generator which is driven by the engine to charge a battery, and an a.c. generator for automobiles which is driven by the automotive engine.

BACKGROUND OF THE INVENTION

FIG. 1 is a sectional view of a prior-art engine starting and charging device disclosed in Laid-Open Japanese Patent No. sho 61-54949. In FIG. 1, a starting and charging device body 1 is constituted of revolving-field poles 2a, 2b, field windings 3, an armature core 4, an armature winding 5, and a crank angle detector 6 as major components.

A pair of revolving-field poles 2a, 2b are comb-shaped ones produced of a ferromagnetic material, and are coupled as a unit through a non-magnetic ring 7 such that these magnetic pole sections are disposed alternately in the circumferential direction.

The revolving-field pole 2a functions also as a flywheel, which is fitted on a crankshaft 8 as a revolving shaft of the engine, and firmly secured by a bolt 9 on the end of this crankshaft 8.

In the side section of the revolving-field pole 2a are formed cutouts 10 which, combined with a crank angle detector 6, are used for the detection of the crank angle. There are provided the same number of cutouts 10 as the revolving-field poles 2a at equal intervals on the circumference.

The width of this cutout 10 in the circumferential direction makes an angle equal to about one half of 360 degrees divided by the number of the cutouts.

The revolving-field poles 2a, 2b described above are so designed as to be excited by energizing the field winding 3, which is installed on the field core 11.

This field core 11 is secured by a bolt not illustrated to a rear plate 12, facing the revolving-field pole 2a across a slight gap a provided in the axial direction, and facing the revolving-field pole 2b across a slight gap b.

The field winding 3 is provided on the fixed side, dispensing with a collector ring; however, because the current flowing into the field winding 3 is much less than the current in the armature winding 5, it is possible to energize it through a collector ring and brushes.

The armature core 4 is formed by laminating silicon steel sheets, within the inner periphery of which are provided a large number of slots for setting the armature winding 5 therein. The armature winding 5 is of a three-phase distributed winding type as a common commutatorless motor.

The armature core 4 is fitted to a mounting frame 13, positioned to the mounting frame 13 by a key not illustrated, and locked from turning. At this time, the armature core 4 is secured by a spacer 14 in the axial direction to the mounting frame 13 through a spring ring 15.

Furthermore, the mounting frame 13 is mounted by a bolt 16 to the rear plate 12. The rear plate 12 is attached to an engine body which is not illustrated.

In the meantime, the crank angle detector 6 described above functions as a signal source which operates the armature current switching circuit. Here, a signal-generating proximity switch is used.

This proximity switch is mounted on the rear plate 12 such that its detector element will face on the circumferential line where the cutout 10 of the revolving-field pole 2a is disposed, and signal generating conditions vary with a change in inductance at the cutout section and non-cutout section of the revolving-field pole 2a, thus outputting a binary signal "1" or "0" correspondingly to the crank angle (field pole position). When a three-phase armature winding 5 is employed, three crank angle detectors 6 will be used.

A clutch 17 serves to interrupt the transmission of power between the crankshaft 8 and a transmission drive shaft 18. This clutch 17 uses a diaphragm spring clutch consisting of a clutch disc 19, a pressure plate 20, a diaphragm spring (disc spring) 12, wire rings 22, 23, and a clutch cover 24.

The clutch cover 22 is mounted by bolts 25 to the revolving-field pole 2a which serves also as the flywheel.

Subsequently, operation at the time of starting will be explained. When the key switch (not illustrated) is placed in the START position with the engine left stationary, the current flows from the battery (not illustrated) into the field winding 3 and the armature winding 5, thereby producing a torque in the revolving-field poles 2a, 2b and accordingly turning the crankshaft 8 which is directly coupled therewith.

As the revolving-field poles start turning, the crank angle detector 6 detects the position of the revolving-field poles, actuating the armature current switching circuit (not illustrated) such that the speed of the revolving field formed by the armature winding 5 will be the same as the speed of rotation of the revolving-field poles, and the revolving-field poles 2a, 2b, receiving the torque, will further accelerate.

Since a great starting torque is obtainable through positive feedback operation, directly-coupled drive is able to the engine in a short time.

Next, when the key switch is placed in the IGNITION position after the engine has started, the starting and charging device body 1 operates as an a.c. generator, the power generated being converted into the direct current by a diode (not illustrated) and supplied to the battery and electrical equipment on the motor vehicle.

The operation of the clutch 17 is as follows. When the clutch pedal (not illustrated) is not depressed, the tension of the diaphragm spring 21, as well known, is added by leverage to the clutch disc 19 mounted on the transmission drive shaft 18 through the pressure plate 21, thus pressing this clutch disc 19 against the side of the revolving-field pole 2a to connect the clutch 17.

Also, when the clutch pedal is depressed, a sleeve which is not illustrated slides in the axial direction, pressing the central part of the diaphragm spring 21 in the direction of the arrow C. Therefore, the diaphragm spring 21 will deflect on the wire rings 22, 23 as a fulcrum, removing the pressure applied to the clutch disc 19. Thus the clutch 17 will become disconnected, interrupting power transmission between the crankshaft 8 and the transmission drive shaft 18.

The starting and charging device body 1 and the clutch 17 are formed as one body by directly connecting the revolving-field pole 2a of the starting and charging body 1 to the engine crankshaft 8 and further by using this revolving-field pole 2a as a carrier of the clutch 17 for connection and disconnection between the crankshaft 8 and the transmission drive shaft 18.

FIG. 2 is a sectional view showing another example of the prior-art engine starting and charging device, in which the same numerals are used for the same parts appearing in FIG. 1 described above, their explanation being omitted.

In FIG. 2, on the bracket 13 are positioned and secured the armature core 4, the field core 11 and the crank angle detector 6. This bracket 13 is mounted by bolts 26 to a cylinder block 28 through a gasket 27; the field core 11 faces the revolving-field poles 2a, 2b with slight gaps a and b provided in the diametrical direction.

In the above-described prior-art starting and charging device, because the whole body of the device is hermetically enclosed, directly affected with the temperature increase of engine, and in addition, the atmospheric temperature of the hermetically enclosed chamber will be increased by a great deal of frictional heat produced by the connection and disconnection of the clutch disc 19 and the clutch 17 and the heat of resistance loss caused by a tremendous current flowing into the armature winding 5 and the current flowing into the field winding 3.

However, the device has such a problem that no means for cooling such as a cooling fan is provided, and if the means for cooling is mounted, a cooling effect in the hermetically enclosed chamber will be low, resulting in an excessive temperature rise at each part, deteriorated quality in respect of heat resistance, a decreased current in the field winding 3 in respect of performance, an excessive degradation of operating characteristics, and consequently in a failure in obtaining a desired starting torque or output current.

FIG. 3 is a sectional view of an a.c. generator for motor vehicles that has a fan as a cooling means. In FIG. 3, numeral 31 is a revolving shaft, on which a pulley 32 is fixedly secured. Numeral 33 is a rotor secured on the revolving shaft 31, and is of the following constitution. Numeral 34 is a revolving-field core, and numeral 35 is the other revolving-field pole, from which a plurality of pole pawl sections 35a are disposed at intervals in the circumferential direction.

Numeral 36 is a non-magnetic support ring secured on the circumference of the pole pawl sections 35a, and numeral 37 is the other revolving-field pole secured by this support ring 36, with a plurality of pole pawl sections 37a disposed at intervals in the circumferential direction, alternately between the above-mentioned pole pawl sections 35a.

Numeral 38 is a fixed field core disposed between the revolving-field core 34 and the other revolving-field pole 37 with an air gap provided therebetween; numeral 39 is a field winding held by this field core 38; and numeral 40 is a fixed armature core, which holds an armature winding 41 in slots.

Numeral 42 is a front bracket which supports the revolving shaft 31 through a front bearing 44 and combinedly supports the armature core 40. In this front bracket 42 is provided a cooling air outlet hole 42a.

Numeral 43 is a rear bracket which combinedly supports the armature core 40. It supports the revolving shaft 31 through a rear bearing 45 and also fixedly supports a field core 38. In this rear bracket 43 is provided a cooling air inlet hole 43a.

Numeral 46 designates a rectifier for converting a.c. power from the armature winding 41 into d.c. power; numeral 47 is a voltage regulator which detects the generator voltage, controls the exciting current, and regulates the terminal voltage to a specific value; and numeral 48 is a fan fixed on the revolving shaft 31.

In the prior-art device described above, the revolving shaft 31 is turned through a belt (not illustrated) and a pulley 32 by the revolution of the engine on the motor vehicle. The a.c. voltage led to the armature winding 41 is regulated to a specific value by means of the voltage regulator 47, thus supplying the d.c. rectified power to the field winding 39 and at the same time to a load such as the storage battery.

In the meantime, as the fan 48 rotates, the cooling air is drawn in at the inlet hole 43a of the rear bracket 43, thus ventilating and cooling the machine interior, being drawn out at the outlet hole 42a of the front bracket 42, and being discharged by the fan 48.

There is, however, a problem that the fan 48, insufficient in cooling capacity, can not sufficiently cool the armature winding 41, the rectifier 46, the voltage regulator 47 and the field winding 39; the output current can not easily be increased on account of limited heat resistance; and the field winding 39 is insufficiently cooled, with the result that the output current decreases in excess.

In the meantime, although there is such a concept as the adoption of a large fan for the purpose of improving the cooling capacity of the fan 48, there still exists a problem in respect of mountability and noise. Since the fan 48 has a limited cooling capacity as described above, there also exists a problem that it is difficult to increase the output current and a large decrease in output must be taken into consideration in designing the fan.

In the meantime, as disclosed in U.S. Pat. Specification No. 4,295,067, the rotating electric machine has a heat pipe projecting out of a housing, but has no sufficient cooling capacity.

Furthermore, as disclosed in Laid-Open Japanese Pat. No. Sho 59-83557, the rotating electric machine which has a coolant passageway formed along the outer periphery of a stator core and is cooled with cooling air from a cooling fan and a coolant flowing in the above-mentioned coolant passageway, has sufficient cooling capacity but is of complicated constitution and costly.

DISCLOSURE OF THE INVENTION

The present invention has been accomplished in an attempt to solve the above-mentioned problems, and has an object to restrain the temperature rise of the armature winding and field winding in order to improve the operating characteristics of the device without using expensive heat-resistant materials, by effectively cooling the armature core and field core.

It is another object of the present invention to restrain the temperature rise of the revolving-field poles to prevent the lowering of the operating characteristics and the deformation and damage of the revolving-field poles.

In the rotating electric machine of the present invention, the armature core and the field core are directly mounted on the cylinder block, and a coolant passageway in this cylinder block is formed in the vicinity of a core mounting area, so that the armature core and the field core can be efficiently cooled by the coolant flowing in this coolant passageway.

Also, in the rotating electric machine of the present invention, the armature core and the field core are directly mounted on the cylinder block, and a heat pipe installed to the armature core or the field core is inserted in the coolant passageway in the cylinder block, thus enabling the efficient cooling of the armature core and the field core.

Furthermore, in the rotating electric machine of the present invention, a bracket on which the armature core and the field core are mounted is installed on the cylinder block, to which is installed a reheat pipe which forms a coolant passageway communicating to a coolant passageway in the cylinder block, thus enabling, together with the bracket, the efficient cooling of the armature core and the field core.

Furthermore, in the rotating electric machine of the present invention, a clutch is disposed between the revolving-field poles mounted on the engine crankshaft and the transmission drive shaft, and a heat pipe is installed in the vicinity of a connection section between the clutch and the clutch plate on this revolving-field pole, thereby restraining the temperature rise of the revolving-field poles and preventing the lowering of operating characteristics and deformation and damage of the revolving-field poles.

Furthermore, in the rotating electric machine, the end portion of a stator winding wound around a stator core is enclosed fluid-tight by an enclosing member; a coolant passageway is formed between this enclosing member and the inner wall of front and rear brackets; and a cooling cover on which a rectifier and a voltage regulator are secured is installed to the rear end section of the rear bracket such that a branch passageway communicating to the above-mentioned coolant passageway will be formed, thereby efficiently cooling the rectifier and the voltage regulator together with the stator winding and the stator core.

BEST MODE OF THE INVENTION

Figure 4:
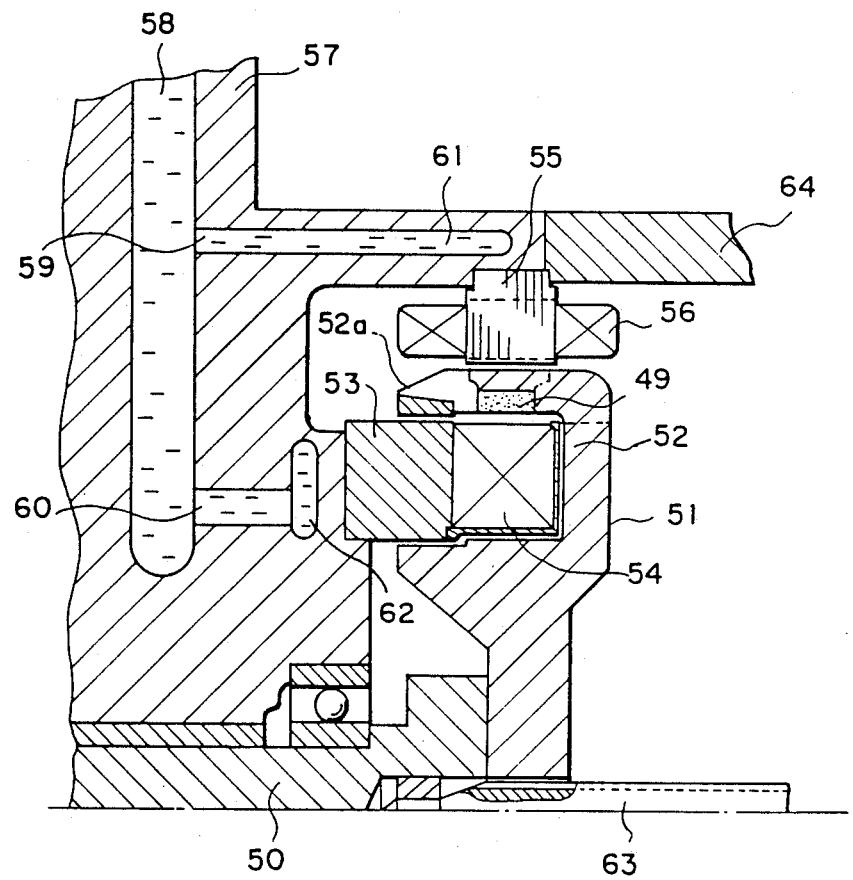
FIG. 4 is a sectional view showing a first embodiment of a rotating electric machine of the present invention in which an armature core and a field core are directly mounted to a cylinder block.

Embodiments of the rotating electric machine of the present invention will now be described with reference to the drawings. FIG. 4 is a sectional view showing the first embodiment of the engine starting and charging device as the rotating electric machine of this invention in which the armature core and the field core are directly mounted to the cylinder block.

In FIG. 4, numeral 50 is a revolving shaft which is overdriven by the engine crankshaft, and numeral 51 is a rotor of an a.c. generator for motor vehicles which is fixedly mounted on this revolving shaft 50. The rotor 51 consists of a revolving-field pole 52 having a plurality of pole pawls 52a so disposed as to be heteropolar on the circumference through a non-magnetic support ring 49. Numeral 53 is a fixed field core disposed in the aforementioned revolving-field pole 52 through an air gap, and holds a field winding 54. Numeral 55 is a fixed armature core wound with an armature winding 56, and numeral 57 is a cylinder block, to which the armature core 55 and the field core are directly installed. Numeral 58 is a coolant circulation system of engine which is formed in the cylinder block 57 and communicates to a radiator which is not shown. Numerals 59 and 60 are coolant inlet ports provided in the cylinder block 57 so as to communicate to the coolant supply side of the above-mentioned coolant circulation system 58, and numeral 61 is an armature core cooling passageway provided in the cylinder block 57 so as to communicate with the inlet port 59, and formed in the vicinity of the armature core 55. Numeral 62 is a field core cooling passageway provided in the cylinder block 57 so as to communicate with the inlet port 60 and formed in the vicinity of the field core 54.

The armature core cooling passageway 61 and field core cooling passageway 62 are so designed as to discharge the coolant from the discharge side (not illustrated) out to the return side of the engine coolant circulation system 58. Numeral 63 is a transmission drive shaft, which is connected to the rotor 51 through a clutch which is not illustrated. Numeral 64 is a transmission case attached to the cylinder block 57.

In the first embodiment of the present invention thus constituted, the coolant filled in the engine coolant circulation system 58 which is connected between the radiator and the cylinder block 57 is circulating between the radiator and the cylinder block 57. The coolant in the return side of the engine coolant circulation system 58 flowing into the inlet ports 59, 60 is led to the coolant passageway 61 on the armature core side and the coolant passageway 62 on the field core side from the inlet ports 59, 60.

The coolant that has entered the coolant passageway 61 on the armature core side is discharged from the discharge side to the return side of the engine coolant circulation system 58 after taking away heat occurring at the armature winding 56 and passing to the armature core 55, thus restraining the temperature rise of the armature core 55 and the armature winding 56.

Similarly, the coolant flows into the coolant passageway 62 on the field core side through the inlet port 60 from the supply side of the coolant circulation system 58 of the engine, absorbing heat from the field winding 54 through the field core 53 to cool the field winding 54 and being discharged from the discharge side to the return side of the coolant circulation system 58 of engine.

The armature core 55 and the field core 53 can be cooled as described above by forcedly circulating the coolant in the passageway 61 on the armature core side and the passageway 62 on the field core side, without using a separate cooling fan and a special line. Consequently, the temperature rise of the armature winding and the field winding can be restrained, thereby improving the operating characteristics of the rotating electric machine.

The coolant passageway 61 on the armature core side and coolant passageway 62 on the field core side can be formed by extending a part of the existing coolant circulation system 58 of the engine in the cylinder block 57, thereby insuring easy cooling of the armature core 55 and the field core 53. In addition, as compared with one in which the cylinder block 57 and the a.c. generator mounting bracket are separately constructed, no sealing member is needed and accordingly coolant leakage at a joint between the sealing member and a bracket or the cylinder block 57 can be prevented.

Figure 5:
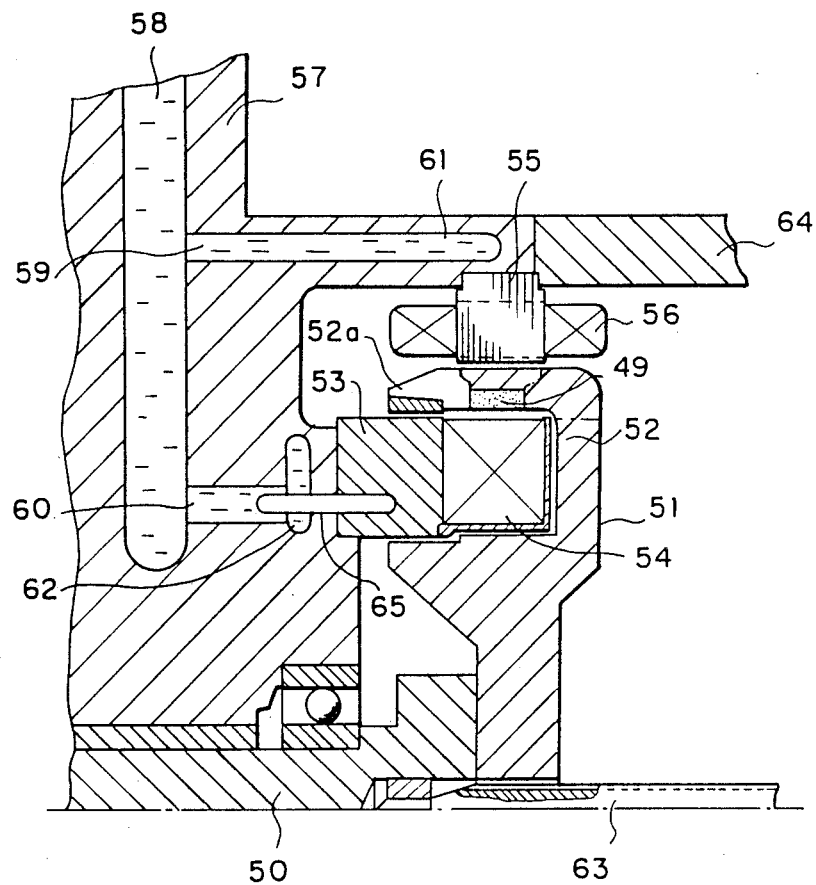
FIGS. 5 to 9 are sectional views showing second to sixth embodiments of the present invention.

FIG. 5 is a sectional view showing the second embodiment of the present invention. As shown in FIG. 5, the present invention has the advantage that the field core 53 is provided with a heat pipe 65, a part of which is projecting into the inlet port 60, thus enabling more efficient cooling of the field core 53, sufficiently flowing the field current, and decreasing output drop.

Figure 6:
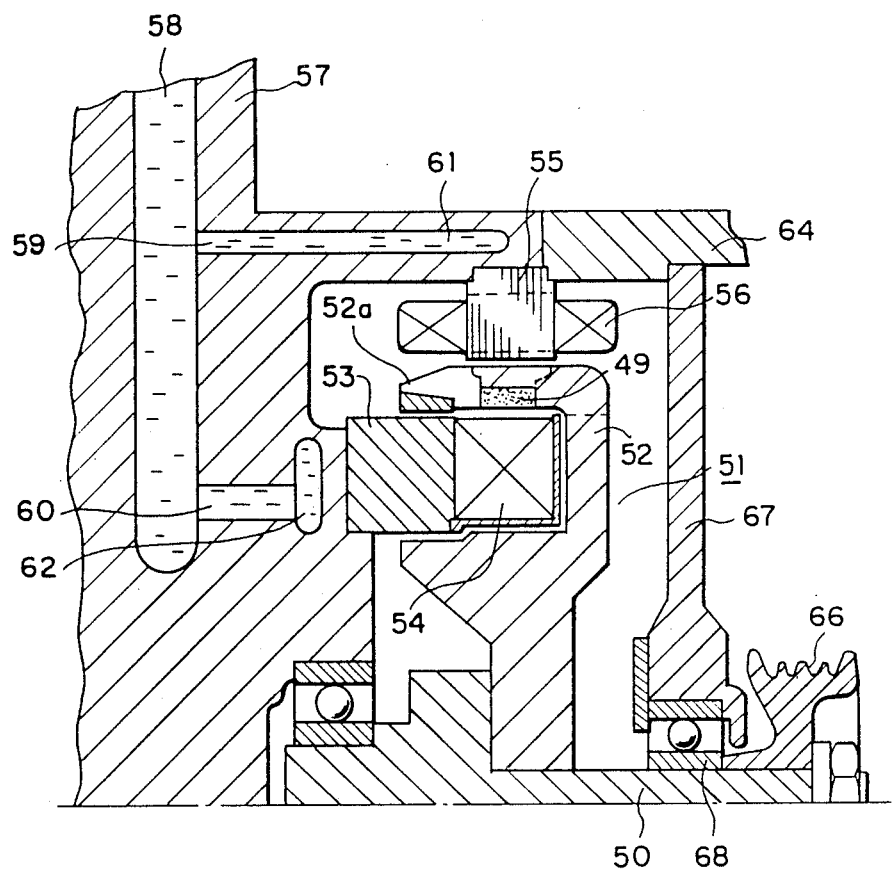

In the above description, the revolving shaft 50 disposed through inside the cylinder block 57 of engine was indicated by example, but a pulley 66 may be fixedly mounted on the right end of the revolving shaft 50 to drive the engine through this pulley as the third embodiment of the present invention shown in FIG. 6. In FIG. 6, numeral 67 is a support case, and numeral 68, a bearing.

Figure 7:
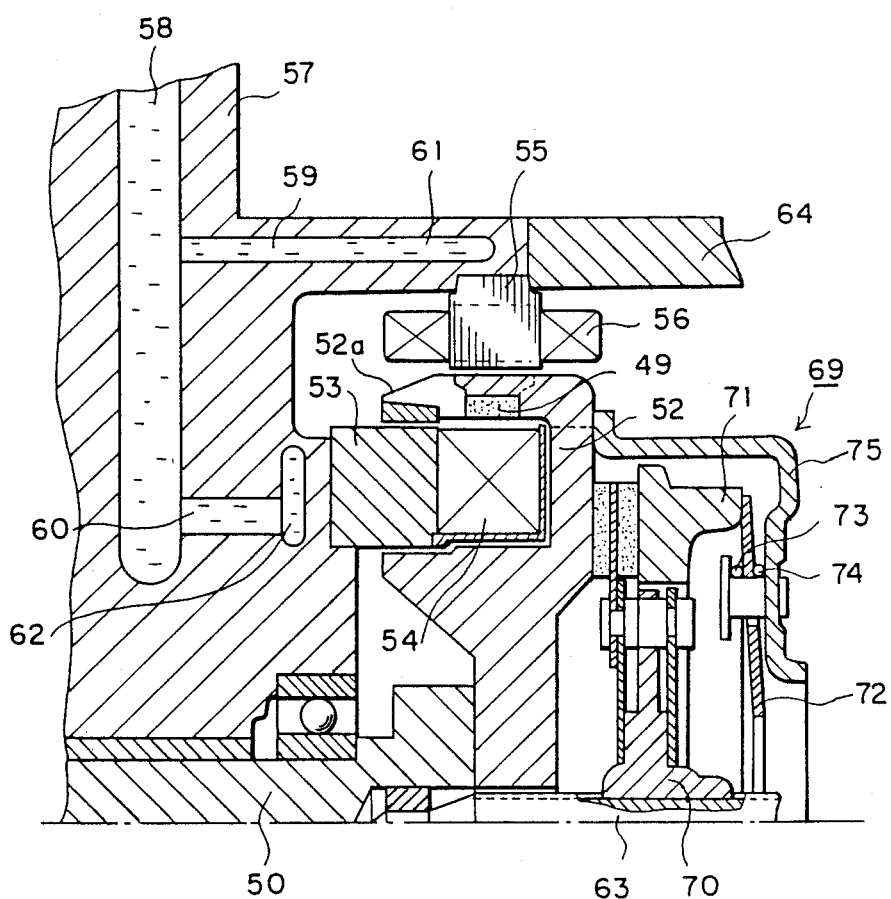

FIG. 7 is a sectional view showing the fourth embodiment of the present invention, wherein a clutch 69 is provided in place of the pulley 66 previously stated in the third embodiment; other constitution, being the same as the third embodiment, will be omitted to prevent reduplicative explanation.

The clutch 69 functions to interrupt the transmission of power between the crankshaft 50 and the transmission drive shaft 63. This clutch 69 uses a diaphragm spring clutch consisting of a clutch disc 70, a pressure plate 71, a diaphragm spring (disc spring) 72, wire rings 73, 74, and a clutch cover 75.

The clutch cover 75 is mounted to the revolving-field pole 52 which functions also as a flywheel.

Figure 1:
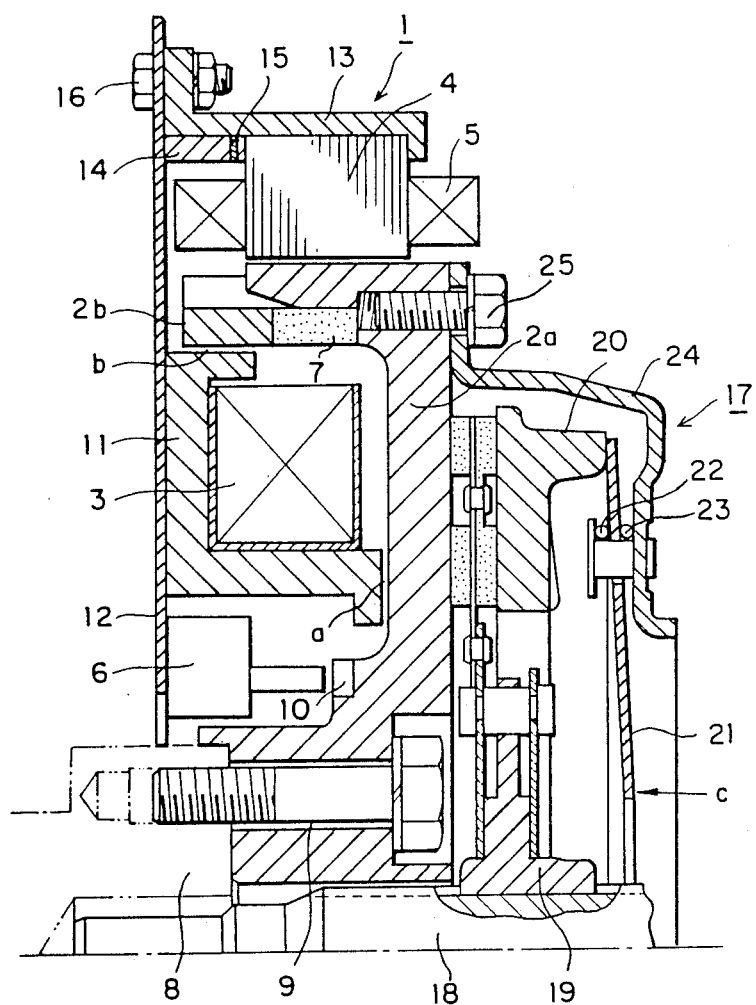
FIG. 1 is a sectional view of a prior-art starting and charging device.
Figure 2:
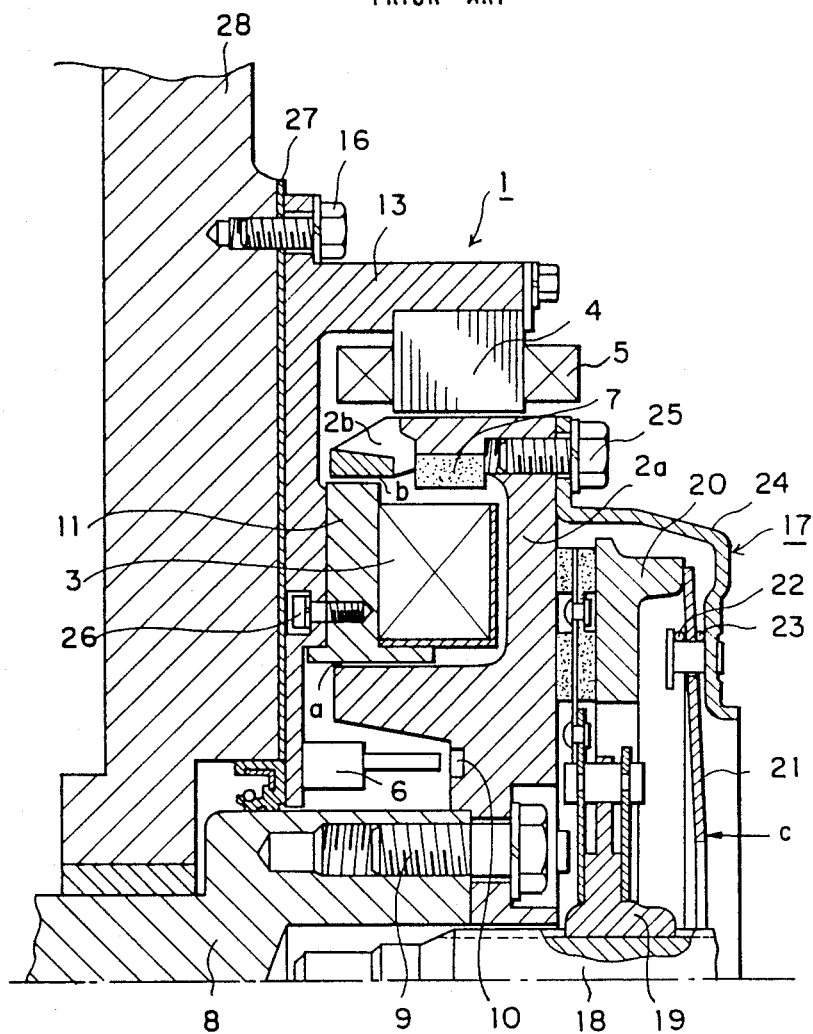
FIG. 2 is a sectional view showing another example of the prior-art starting and charging device.
Figure 3:
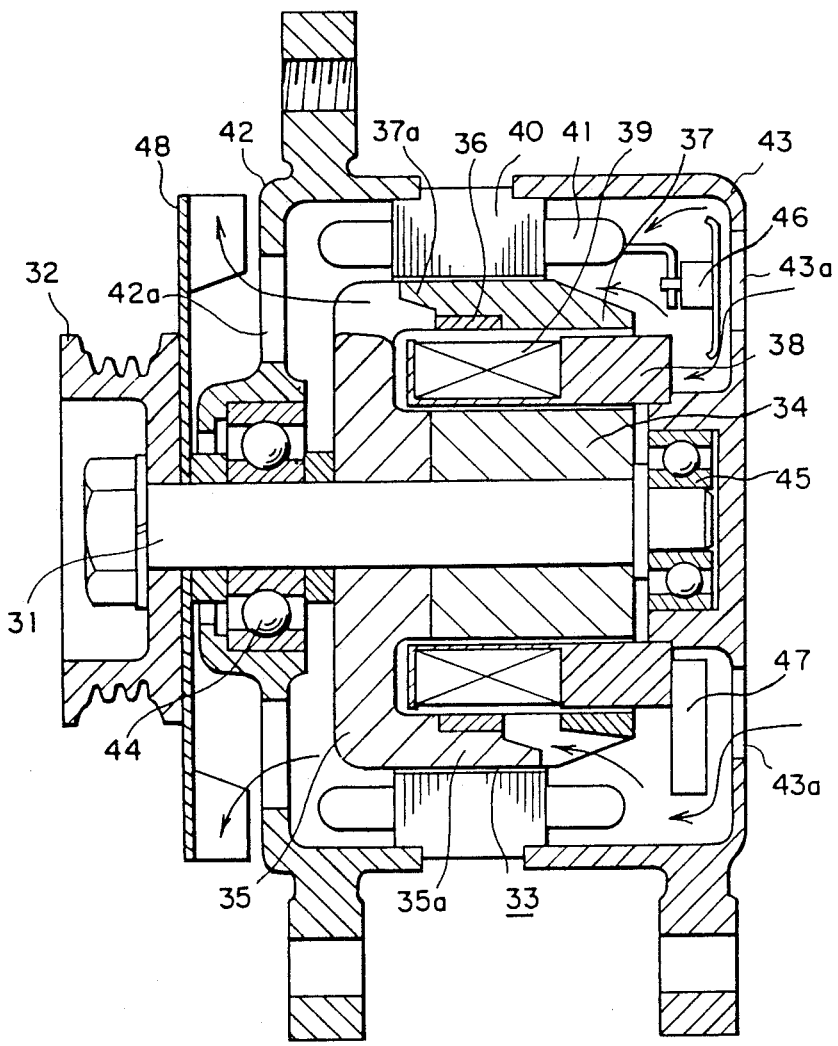
FIG. 3 is a sectional view of a prior-art a.c. generator for motor vehicles.

Explanation of the operation of the above-mentioned clutch 69, being the same as the clutch of the prior-art device shown in FIGS. 1 and 2, will be omitted.

Figure 8:
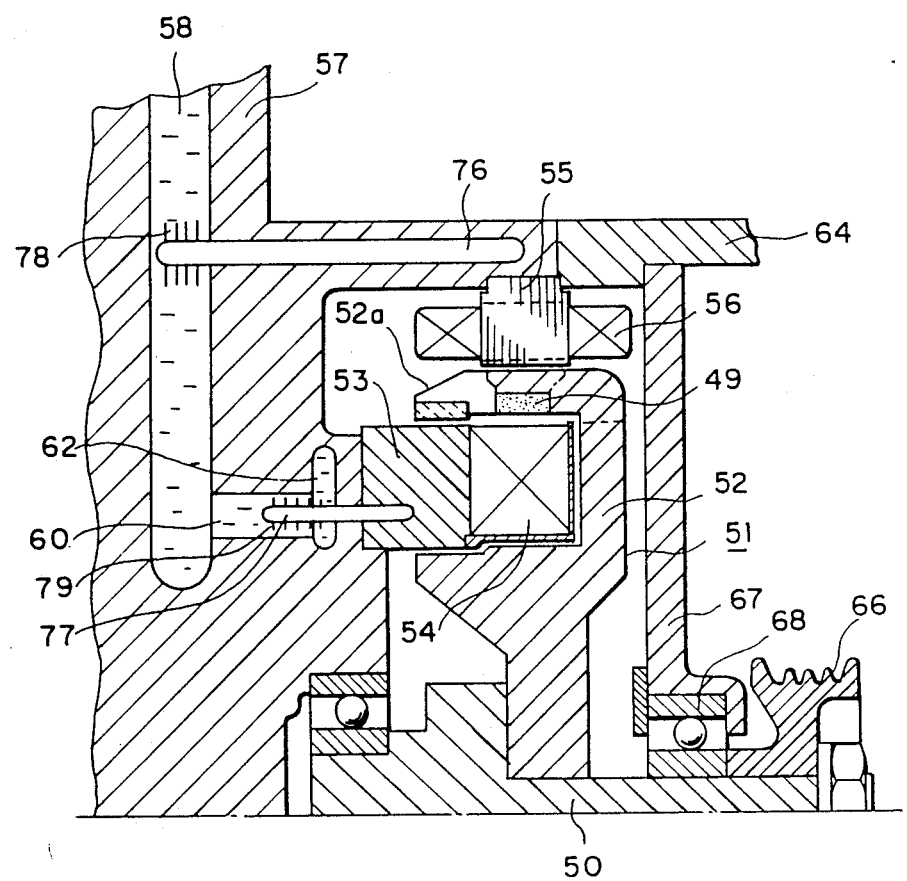

FIG. 8 is a sectional view showing the fifth embodiment of the present invention, wherein heat pipes 76 are buried at several places on the whole circumference in the vicinity of the armature core mounting section of the cylinder block 57, the forward end of the heat pipe 76 is inserted in the coolant circulation system 58, and also heat pipes 77 are arranged at several places on the whole circumference near the field winding 54 of the field core 53 so as not to interfere with the magnetic path of the field core, the forward end of the heat pipes 77 being inserted in the inlet port 60 and the coolant passageway 62 on the field core side. For other constitution, which is the same as the third embodiment shown in FIG. 6 described above, the same numerals are used for the same parts and their explanation is omitted.

The above-mentioned heat pipes 76 and 77 are provided at their ends with a plurality of fins 78 and 79 for the purpose of improving heat dissipation effect.

In the heat pipes 76 and 77 is filled such an evaporable working fluid as water, alcohol or ammonia, by the evaporation and condensation cycle of which heat exchange is accomplished, thereby effectively preventing the temperature rise of the armature core 55 and the field core 53.

Next the operation, particularly cooling function, of this embodiment will be explained.

The coolant filled in the coolant circulation system 58 of engine which is connected between the radiator and the cylinder block 57 is circulating between the radiator and the cylinder block 57, flowing from the supply side of the coolant circulation system 58 of engine to the coolant passageway 62 on the field core side through the inlet port 60, then returning to the return side of the coolant circulation system 58 of engine again.

In this coolant circulation process, heat generated from the field winding 54 is absorbed by the coolant through the field core 53.

At the same time, the heat of the field core 53 is led by the heat pipe 77 to the coolant passageway 62 on the field core side, being absorbed by the coolant, and simultaneously heat exchange and cooling are performed by the evaporation and condensation cycle of the heat pipe 77, thereby effectively preventing, with the coolant flowing in the coolant passageway 62 on the field core side, the temperature rise of the field core 53. Consequently it is possible to use a small-sized, high-output rotating electric machine and also to restrain output drop.

In the meantime, heat occurring in the armature winding 56 passes to the heat pipe 76 through the armature core 55. The heat that has passed through this heat pipe 76 is absorbed by the coolant in the coolant circulation system 58 of engine, and, at the same time, heat exchange and cooling are done also by the evaporation and condensation cycle of the working fluid in the heat pipe 76.

Figure 9:
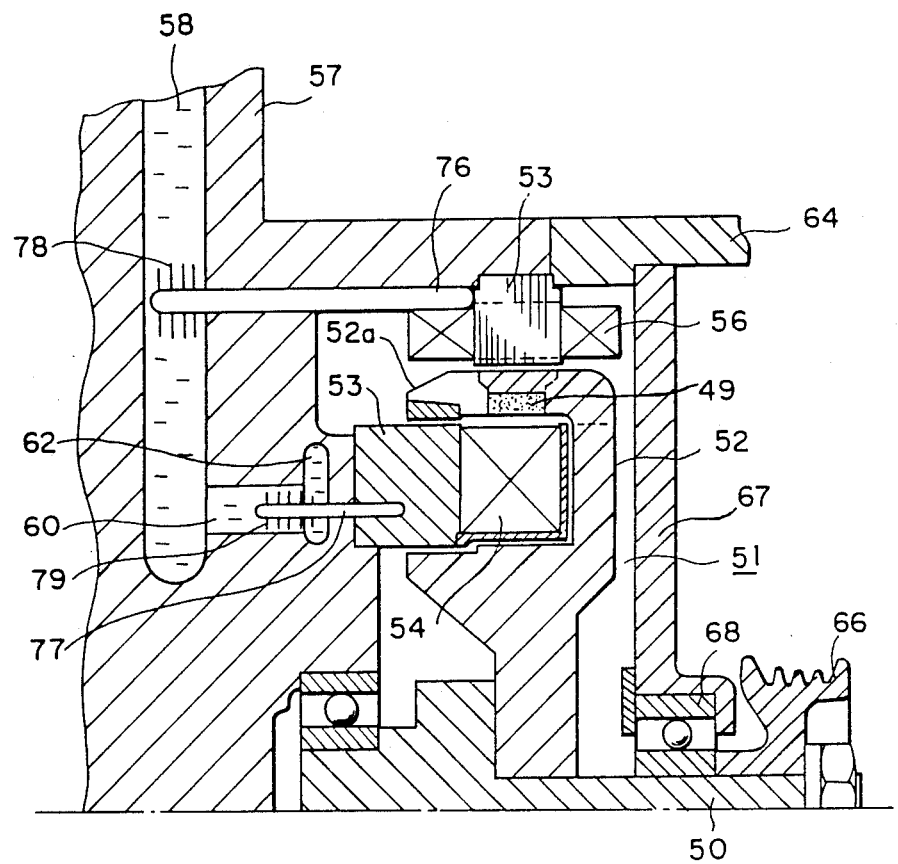

FIG. 9 is a sectional view showing the sixth embodiment of the present invention, which has the heat pipe 76 installed directly on the armature core 53 described in the fifth embodiment shown in FIG. 8. Other constitution, being the same as that shown in FIG. 8 in which the same numerals are used for the same parts, will not be explained.

In this case, a suitable heat pipe 76 mounting position is the core end for example where the magnetic circuit of the armature core 53 will not be affected.

The provision of the heat pipe 77 on the field core 53 side is not necessarily required because the amount of heat generated from the field winding is little as compared with that generated from the armature winding 56.

Figure 10:
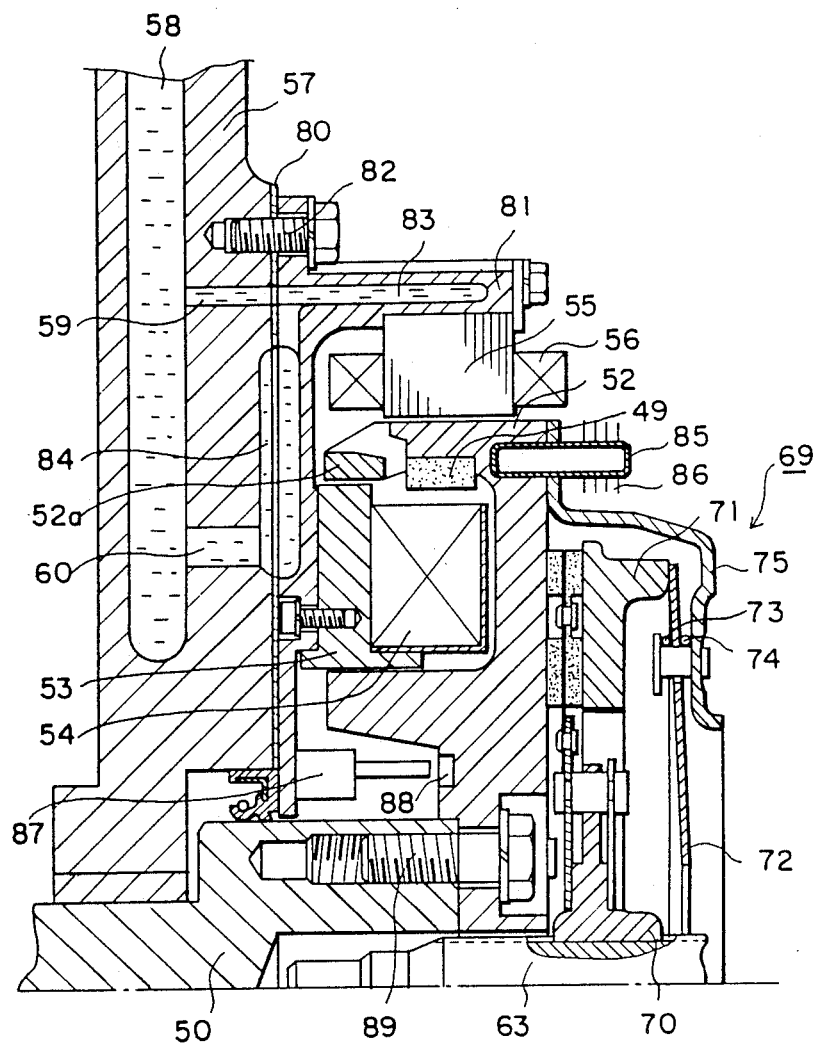
FIG. 10 is a sectional view showing a seventh embodiment of a rotating electric machine of the present invention in which an armature core and a field core are mounted to a cylinder block through a bracket.

FIG. 10 is a sectional view showing the seventh embodiment of the present invention, in which the same numerals are used for the same parts described above in FIG. 7, the explanation of which, therefore, will be omitted, and principally those which differ from FIG. 7 will be described.

In FIG. 10, a bracket 81 is fixed by a bolt 82 to the cylinder block 57 through a gasket 80 for sealing. This bracket 81 is produced of a material of good thermal conductivity, such as aluminum.

In this bracket 81 are fitted the armature core 55 and the field core 53. In the bracket 81, the coolant passageway 83 on the armature core side is formed in the vicinity of the armature core 55 and at the same time the coolant passageway 84 on the field core side is also formed in the vicinity of the field core 53.

The cylinder block 57 is provided with the inlet ports 59, 60 so that the coolant circulation system of engine described above will communicate with the coolant passageway 83 on the armature core side and the coolant passageway 84 on the field core side. That is, the coolant circulation system 58 of engine communicates with the coolant passageway 83 on the armature core side through the inlet port 59, and, similarly, the coolant circulation system 58 of engine communicates with the coolant passageway 84 on the field core side through the inlet port 60.

On the outer periphery section of the revolving-field pole 52 are installed heat pipes 85 of the identical construction as the heat pipes described above in the fifth embodiment. These heat pipes 85 are projecting outwardly at one end. There are provided with a plurality of, for example six, heat pipes 85 at equal intervals on the circumference.

On the outside surface of one end of these heat pipes 85 are installed a plurality of fins 86 at fixed intervals for the purpose of improving a heat dissipation effect. These fins 86 have specific thickness and are of a collar shape (doughnut disc shape), thereby increasing the vibration resistance and mechanical strength of the heat pipes 85.

The heat of the revolving-field pole 52 is dissipated outwardly by means of this heat pipe 85. This revolving-field pole 52 becomes hot due to frictional heat generated at the time of connection and disconnection of the clutch 69, resulting in lowered magnetic characteristics. The revolving-field poles 52, however, will be cooled by dissipating the heat by the above-mentioned heat pipe 85. In consequence, the temperature rise of the revolving-field pole can be restrained and further the lowering of operating characteristics and deformation and damage of the revolving-field poles 52 can be prevented.

Heat dissipation of the armature core 55 is carried out by cooling the core with the engine coolant flowing into the coolant passageway 83 on the armature core side. This coolant returns to the return side of the coolant circulation system 58 of engine after flowing from the supply side of the coolant circulation system 58 of engine into the armature core coolant passageway 83 through the inlet port 59.

Similarly, the field core 53 is cooled with the coolant flowing from the supply side of the coolant circulation system 58 of engine into the coolant passageway 84 on the field core side through the inlet port 60. This coolant returns to the return side of the coolant circulation system 58 of engine.

In FIG. 10, numeral 87 is a crank angle detector fixed on the bracket 81, and numeral 88 is a cutout formed in the side of the revolving-field pole 52 which, combined with the crank angle detector 87, is used to detect the crank angle. It is of the same constitution as an example of prior art shown in FIG. 1 previously stated. Numeral 89 is a bolt mounting the revolving-field pole 52 firmly on the shaft end of the crank shaft 50.

Figure 11:
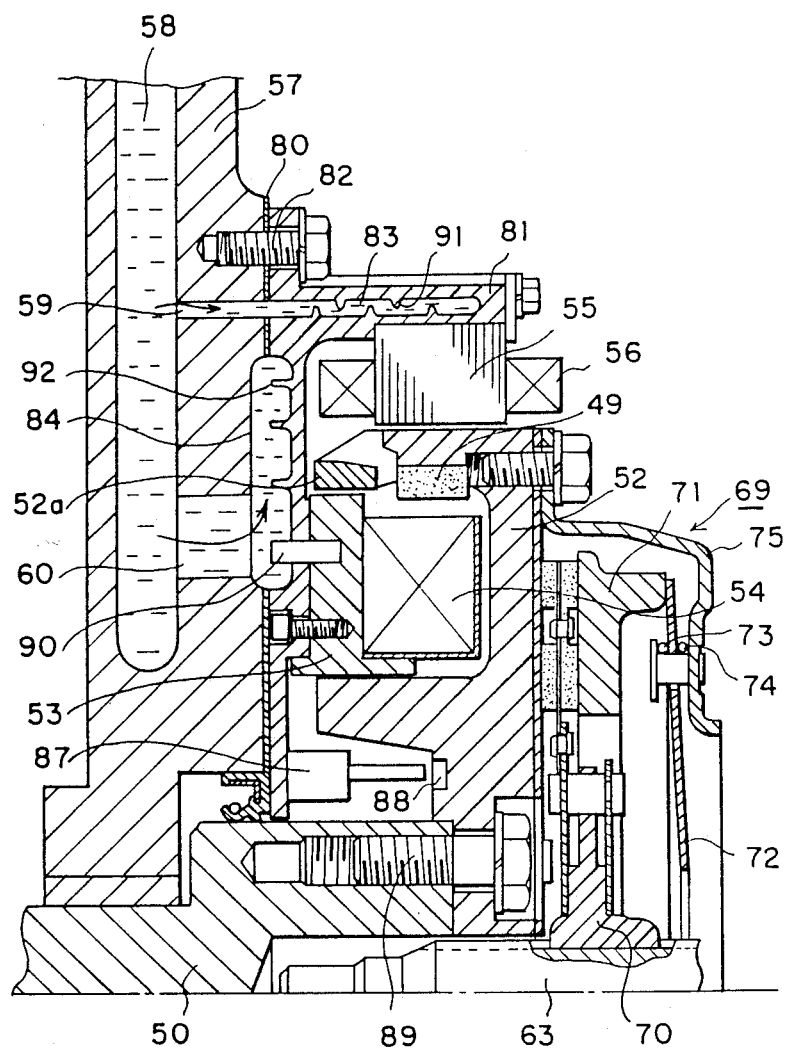
FIG. 11 is a sectional view showing an eighth embodiment of the present invention.

FIG. 11 is a sectional view showing the eighth embodiment of the present invention, in which the same numerals are used for the same parts in FIG. 10 described above, the explanation of which, therefore, is omitted, and parts different from FIG. 10 will be mainly described.

In FIG. 11, on the bracket 81 is provided a heat pipe 90 as a good heat conductor which is connected between the field core 53 and the coolant passageway 84 on the field core side, such that the heat of the field core 53 can be highly efficiently transmitted to the coolant flowing in the coolant passageway 84 on the field core side.

The coolant passageway 83 on the armature core side and the coolant passageway on the field core side are either provided with fins 91, 92, by which the heat dissipation effect has been improved.

Figure 12:
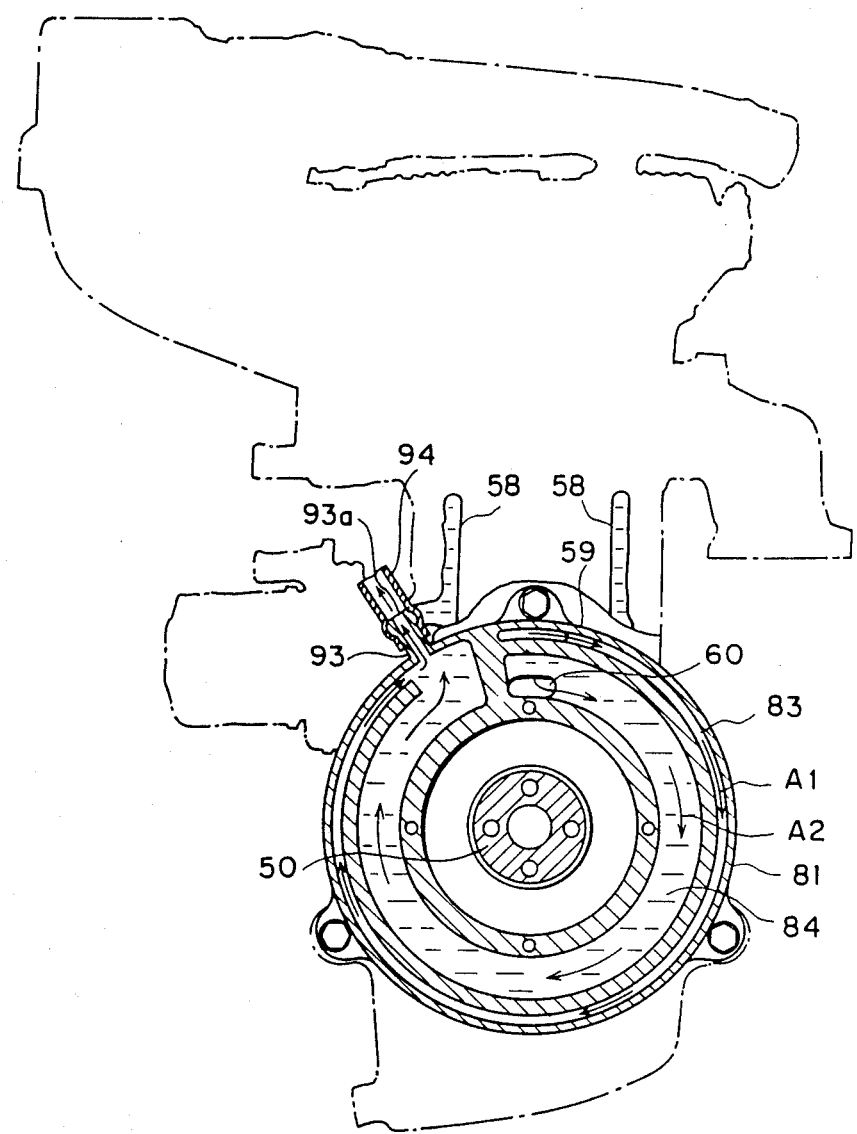
FIG. 12 is a sectional view showing a part of an armature core and a field core side viewed from the engine block side of the eighth embodiment.

Furthermore, on the above-described bracket 81 is installed a discharge joint 93 as shown in FIG. 12. With the discharge port 93a of this discharge joint 93, a discharge tube 94 is connected. This discharge joint 94 is connected to a radiator (not illustrated).

Next, the cooling function of this embodiment will be described. The coolant filled in the coolant circulation system 58 of engine between the radiator and the cylinder block 57 is circulating between the radiator and the engine block 57, leading the coolant on the supply side of the coolant circulation system 58 of engine from the inlet ports 59, 60 to the coolant passageway 83 on the armature core side and to the coolant passageway 84 on the field core side, and flowing in the coolant passageway 83 on the armature core side adjacent to the armature core 55 and in the coolant passageway 84 on the field core side adjacent to the field core 53.

As clear from FIG. 12, the coolant passageway 83 on the armature core side and the coolant passageway 84 on the field core side are separately constituted; the coolant flowing into the inlet port 59 flows in the direction of the arrow A1 in the coolant passageway 83 on the armature core side, absorbing heat generated at the armature winding 56 through the armature core 55.

Similarly, the coolant flowing from the inlet port 60 into the coolant passageway 84 on the field core side flows in the direction of the arrow A2, absorbing the heat generated at the field winding 54 through the field core 53.

At this time, the heat of the field winding 54 is transmitted to the coolant flowing into the coolant passageway 84 on the field core side through the field core 53.

The coolant in the coolant passageway 83 on the armature core side and the coolant in the passageway 84 on the field core side that have thus absorbed the heat meet at the discharge joint 93, and returns to the return side of the coolant circulation system 58 of engine through the discharge tube 94, flowing toward the radiator.

Figure 13:
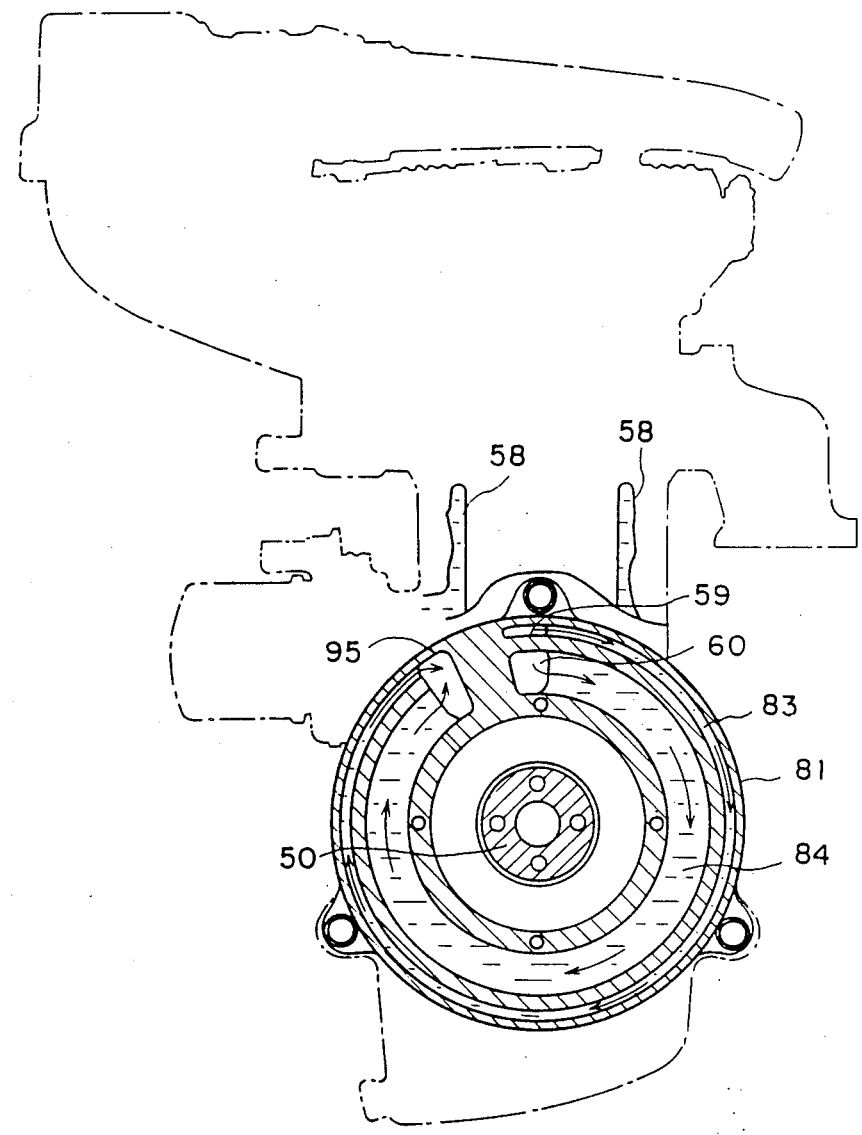
FIGS. 13 to 16 are the same sectional views showing ninth to twelfth embodiments in accordance with the present invention.

FIG. 13 is a sectional view showing the ninth embodiment of the present invention correspondingly to FIG. 12 described above. In FIG. 13, the discharge joint 93 and the discharge tube 94 in FIG. 12 are not provided, and the coolant that has entered the coolant passageway 83 on the armature core side and the coolant passageway 84 on the field core side returns directly to the return side of the coolant circulation system 58 of engine through the discharge port 95. Other constitution, function and effect are identical to the eighth embodiment described above.

Figure 14:
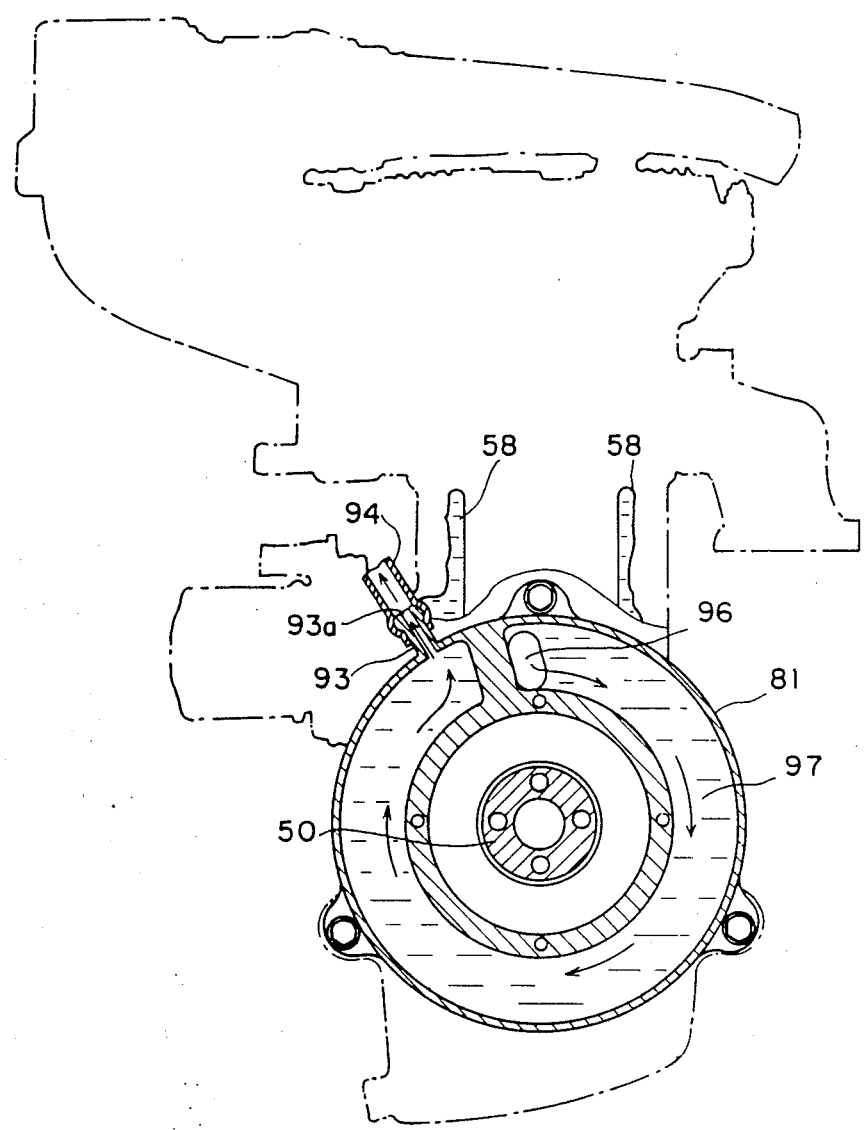

FIG. 14 is a sectional view of the tenth embodiment of the present invention corresponding to FIG. 12 described above. In FIG. 14, the coolant passageway 83 on the armature core side and the coolant passageway 84 on the field core side are not separate, but common, like those shown in FIG. 12.

Namely, a common coolant passageway 97 starting with the inlet port 96 which communicates with the coolant circulation system 58 of engine is formed in the bracket 81. The coolant flowing into this common coolant passageway 97 commonly cools the armature winding 56 and the field winding 54 through the armature 55 and the field core 53, then returning to the return side of the coolant circulation system 58 of engine through the discharge joint 93 and the discharge tube 94.

Figure 15:
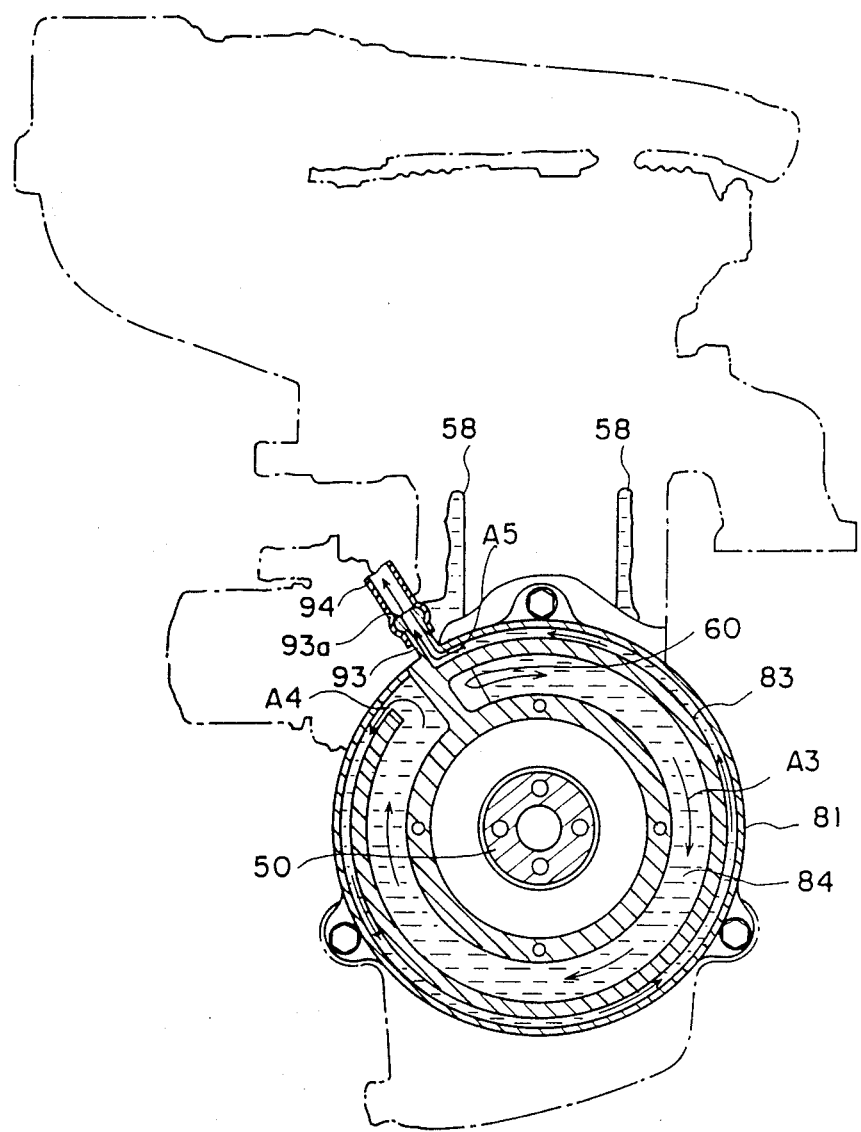

FIG. 15 is a sectional view of the eleventh embodiment of the present invention corresponding to FIG. 12 described above. In the bracket 81, the end of the coolant passageway 84 on the field core side is connected to the end of the coolant passageway 83 on the armature core side, and the coolant passageway 83 on the armature core side is connected with the discharge joint 93.

According to the above-mentioned constitution, the coolant on the supply side of the coolant circulation system 58 of engine is led from the inlet port 60 formed in the coolant passageway 84 on the field core side, flows in the direction of the arrow A3 to cool the field core 53, and also in the direction of the arrow A4 to cool the armature core 55 while flowing in the coolant passageway 83 on the armature core side.

Furthermore, the coolant that has flowed in the coolant passageway 83 on the armature core side advances in the direction of the arrow A5, flowing to the return side of the coolant circulation system 58 of engine after passing through the discharge joint 93 and the discharge tube 94.

Figure 16:
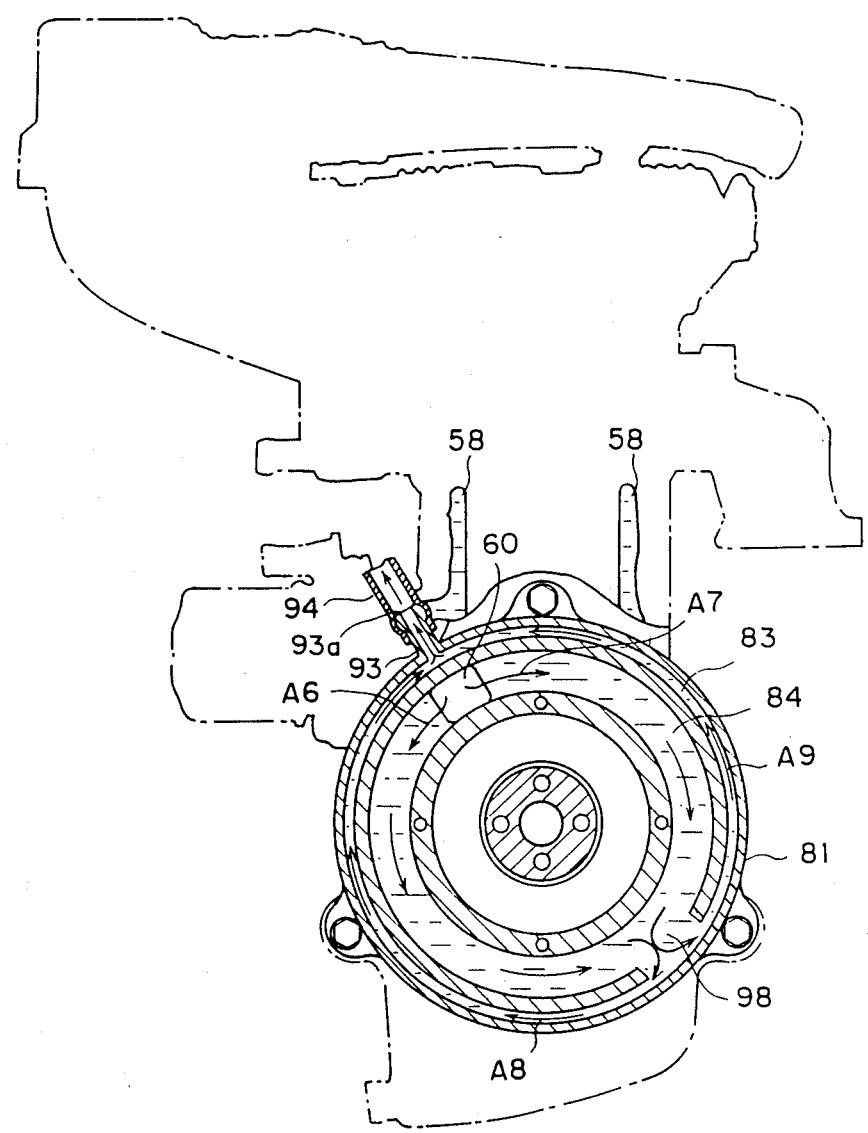

FIG. 16 is a sectional view of the twelfth embodiment of the present invention corresponding to FIG. 12 described above. In the case of FIG. 16, the inlet port 60 is provided on the coolant passageway 84 on the field core side, and the coolant coming from the supply side of the coolant circulation system 58 of engine through this inlet port 60 is branched into the right and left passageways as indicated by the arrows A6, A7, and meet at a junction 98 formed on the opposite side of the inlet port 60.

This junction 98 communicates with the coolant passageway 83 on the field core side, and this coolant passageway 83 on the field core side communicates with the discharge joint 93.

Therefore, the coolant that has met at the junction 98 is divided again into the right and left passageways as indicated by the arrows A8, A9 in the coolant passageway 83 on the field core side, and then returns to the return side of the coolant circulation system 58 of engine after meeting at the discharge joint 93 and flowing through in the discharge tube 94.

Figure 17:
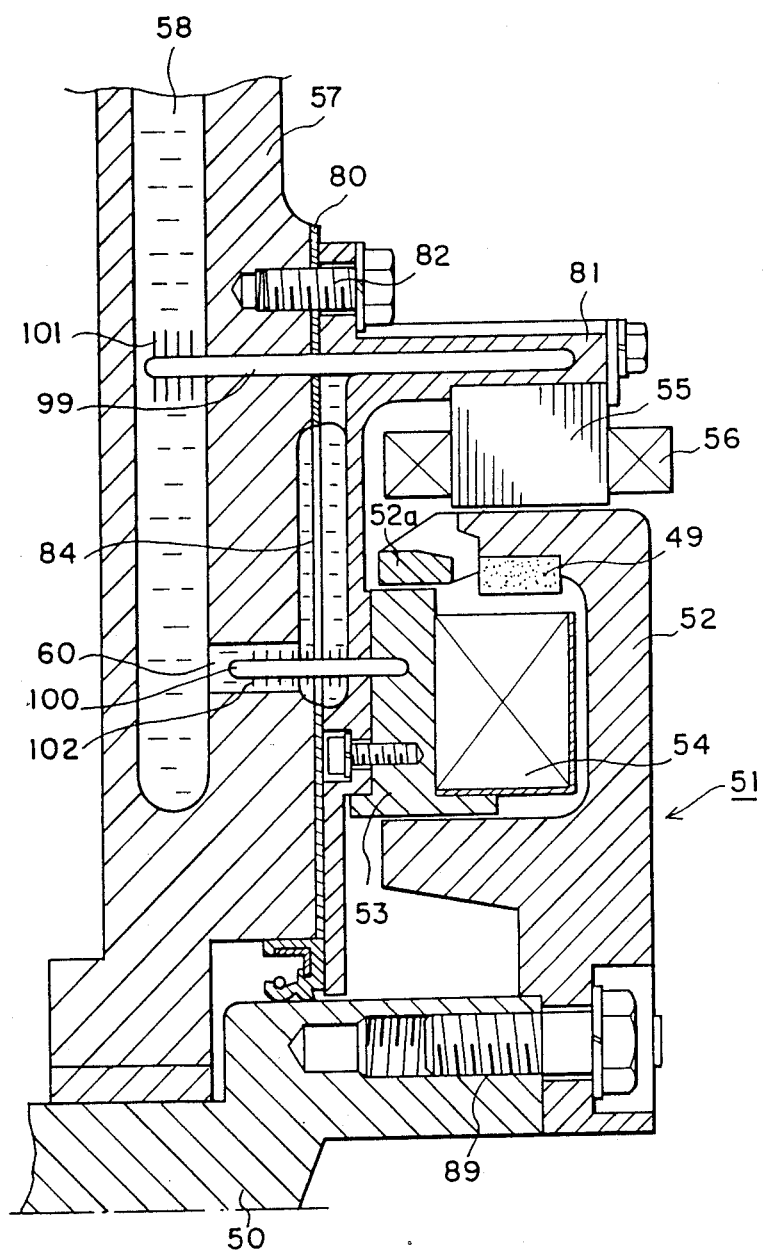
FIGS. 17 to 21 are sectional views showing thirteenth to seventeenth embodiments of the present invention.

FIG. 17 is a sectional view showing the thirteenth embodiment of the present invention, wherein heat pipes 99 are embedded in several places on the whole circumference near the armature core mounting section of the bracket 81; the forward ends of the heat pipes 99 are inserted into the coolant circulation system 58; and also heat pipes 100 are arranged at several places on the whole circumference in the vicinity of the field winding 54 of the field core 53 such that the magnetic passageway of the field core will not be interfered, the forward ends of the heat pipes 100 being inserted into the inlet port 60 and the coolant passageway 84 on the field core side. In this drawing, numerals 101 and 102 are fins provided on the forward ends of the heat pipes 99 and 100. The constitution and cooling function of these heat pipes are identical to the fifth embodiment of the present invention shown in FIG. 8 described above.

In FIG. 17, the same numerals are used for the same parts appearing in FIG. 10 described above, and their explanation will be omitted.

Figure 18:
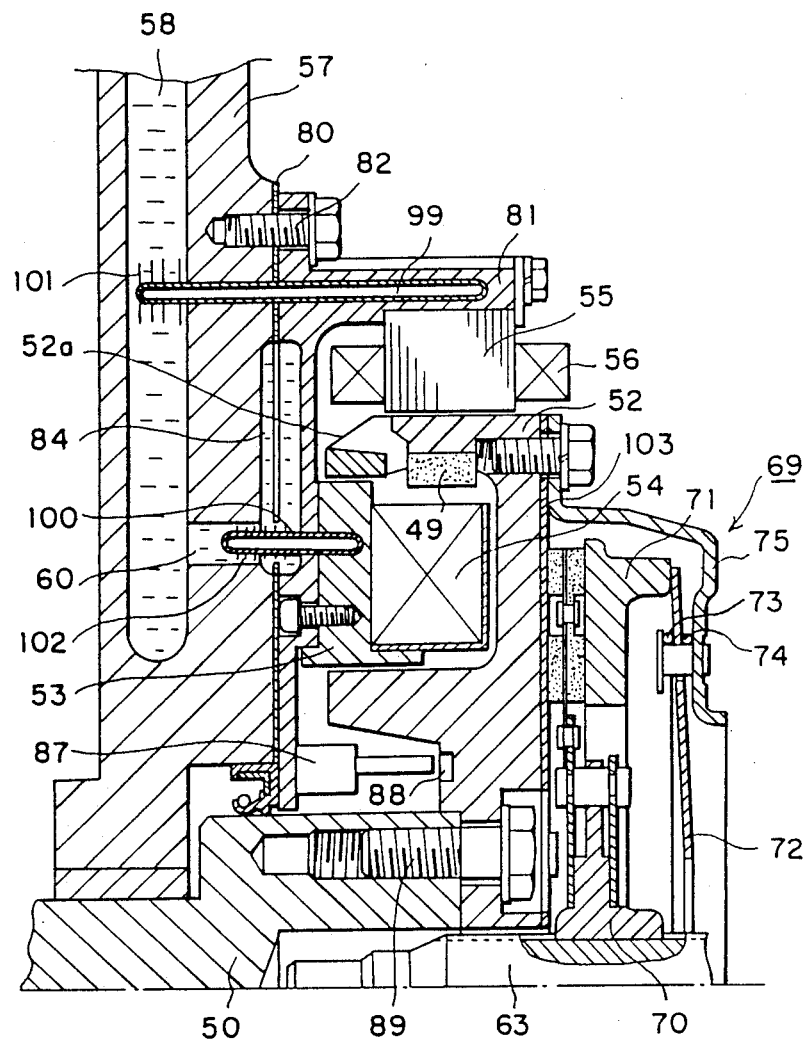

FIG. 18 is a sectional view showing the fourteenth embodiment of the present invention, in which a clutch plate 103 produced of asbestos or gray cast iron of high wear resistance is mounted on the side of the revolving-field pole 52 in the thirteenth embodiment described above, and the clutch 69 is provided so as to act on this clutch plate 103. The constitution and function of this clutch 69 are identical to those shown in FIG. 7 described above.

Figure 19:
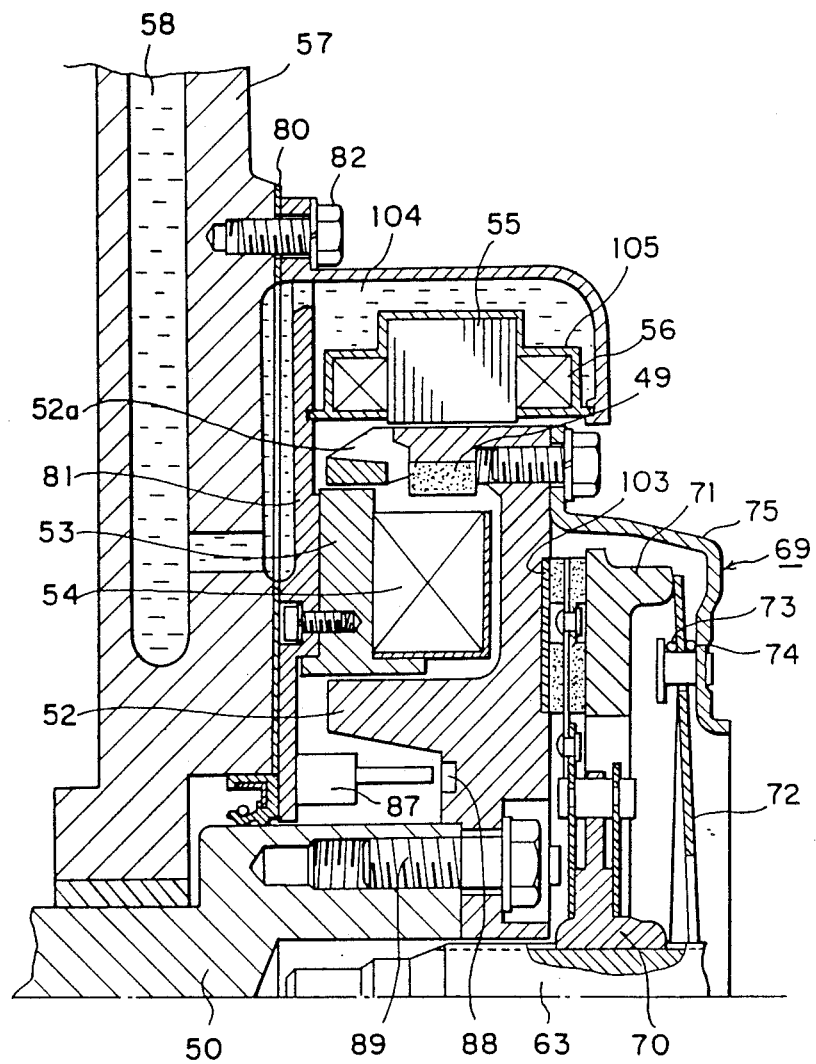

FIG. 19 is a sectional view showing the fifteenth embodiment of the present invention, in which the same numerals are used for the same parts in the fourteenth embodiment described above; therefore, explanation will be made principally on parts different therefrom.

In FIG. 19, numeral 104 designates a coolant passageway formed by connecting to the coolant passageway 58 of the cylinder block 57. The coolant passageway is formed between the armature core 55 and the armature winding 56 and the bracket 81 such that it passes near the field core 53, enclosing the outer periphery of the armature core and the armature winding. The outer periphery of the armature core 55 and the armature winding 56, excluding the surface of the armature core 55 opposite to the revolving-field pole 52, is moulded with resin 105.

In the fifteenth embodiment constituted as described above, since the coolant of the cylinder block 57 flows to circulate in the coolant passageway 58, the heat generated from the armature winding 56 and the field winding 54 is absorbed by the coolant, thereby restraining the temperature rise of the armature winding 56 and the field winding 54.

Engine starting, battery charge, and operation of the clutch 69 are similar to those of other embodiments, and therefore their explanation will be omitted.

Figure 20:
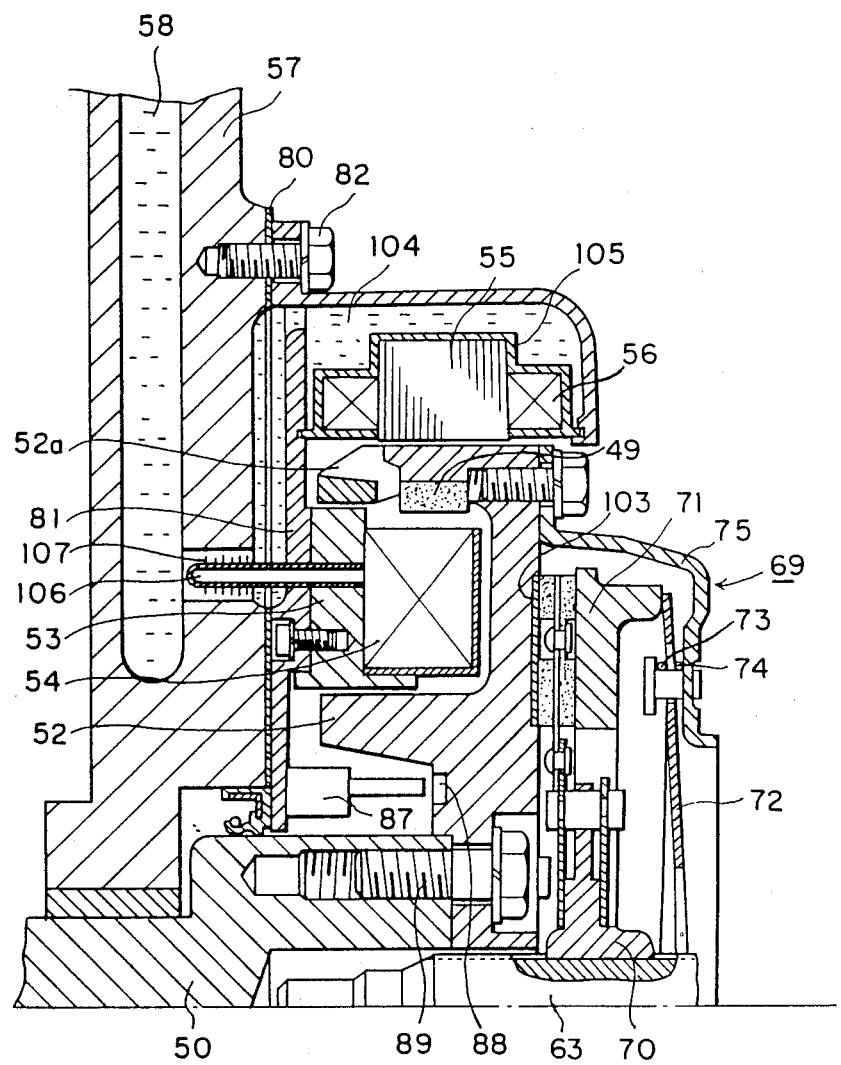

FIG. 20 shows the sixteenth embodiment of the present invention in which heat pipes are employed as a cooling means which connects the field winding 54 with the coolant passageway 58. Heat pipes 106 are arranged in several places on the whole circumference of the field core 53, with their one end disposed in the field core 53 and the other end positioned in the coolant passageway 58. The other end of these heat pipes 106 are provided with a number of cooling fins 107. The constitution of other parts is similar to the fifteenth embodiment described above.

In the sixteenth embodiment of such constitution, the field winding 54 is cooled more effectively with the heat pipes 106.

Figure 21:
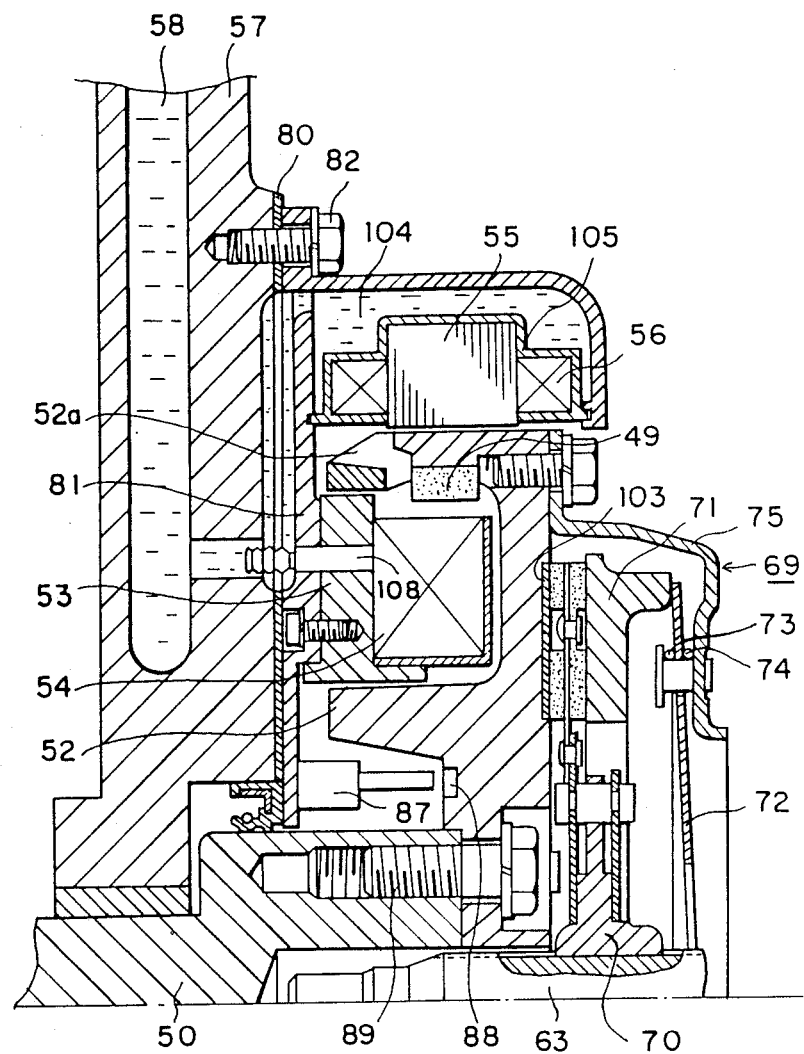

FIG. 21 shows the seventeenth embodiment of the present invention wherein a heat-dissipating member 108 of good heat conductance produced of such as copper, aluminum and so forth, is provided in the position of the heat pipes 106 in the sixteenth embodiment described above.

This heat-dissipating member 108 also is set up at several places at equal intervals on the whole circumference of the field core 53, and on its other end are formed a number of cooling fins projecting into the coolant passageway 58. Other constitutions are similar to the fifteenth and sixteenth embodiments described above; the same numerals are used for corresponding parts, the explanation of which, therefore, is omitted.

In the seventeenth embodiment also, the presence of the heat-dissipating members 108 insures good heat transmission from the field winding 54 to the coolant, thereby restraining the temperature rise of the field winding 54.

Figure 22:
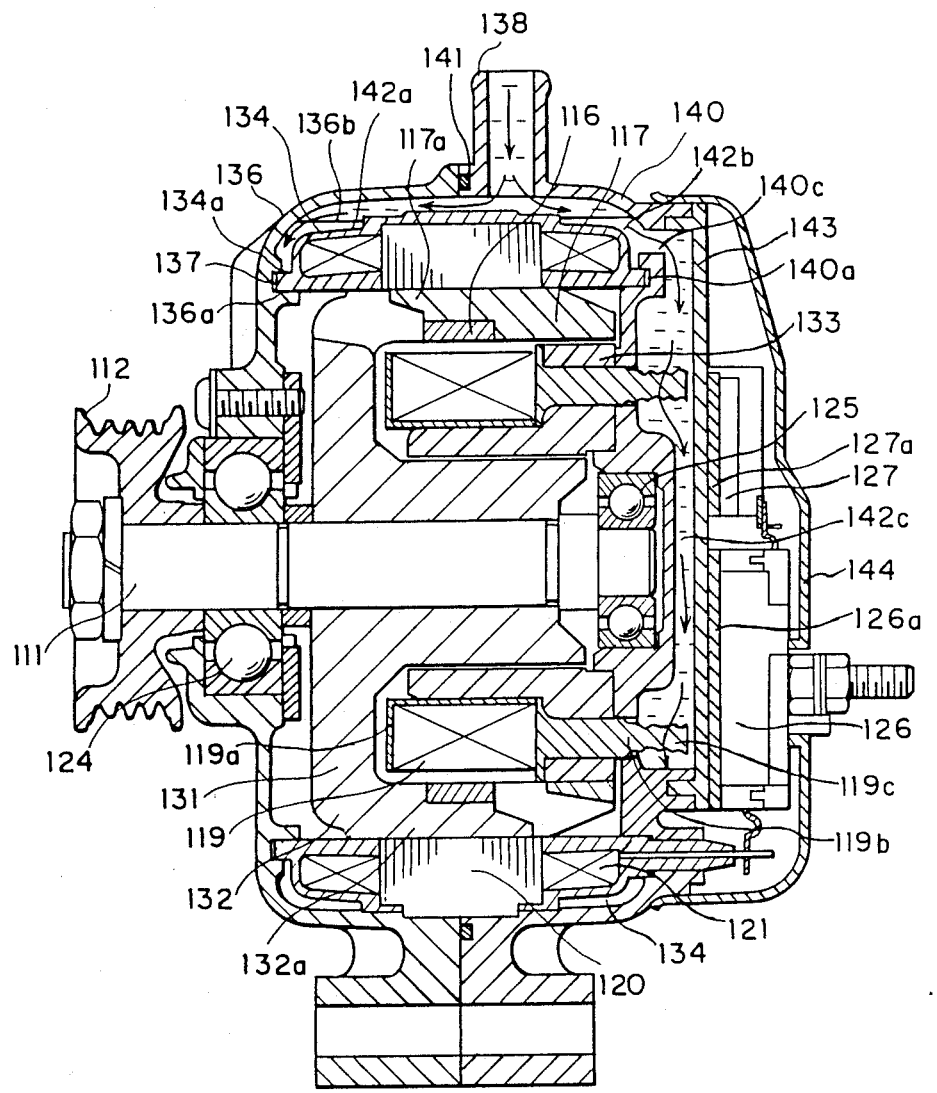
FIG. 22 is a sectional view showing an eighteenth embodiment of the present invention.
Figure 23:
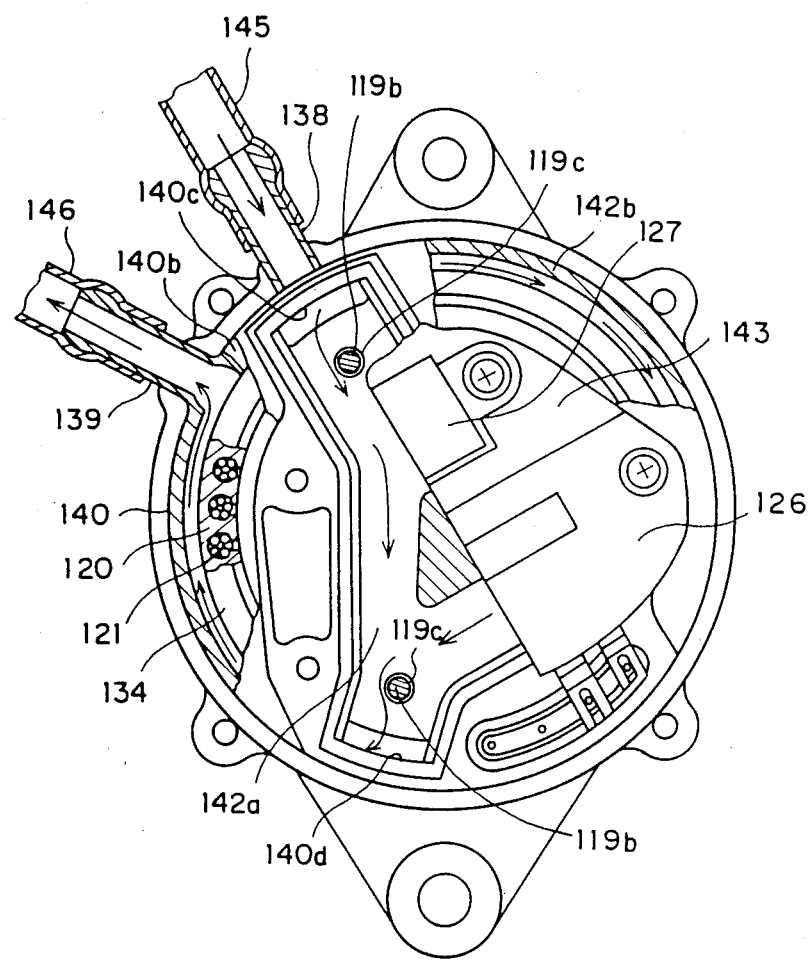
FIG. 23 is a front view, partly broken, exclusive of a protective cover of the eighteenth embodiment.

FIG. 22 is a sectional view showing the eighteenth embodiment of the present invention. In FIG. 22, numeral 131 is a rotor, and one magnetic pole core 132 fixedly mounted on a revolving shaft 111 has a plurality of pole pawl sections 132a disposed at intervals in the circumferential direction, alternately with the pole pawl sections 117.

Numeral 133 is a fixed core on the exciting side which is installed to one and the other magnetic pole cores 132 and 117 through an air gap, holding the exciting winding 119. Numeral 134 denotes a pair of enclosing members provided on both sides which enclose both ends of the stator winding 121. It is produced from an insulating material such as synthetic resin and is fixedly installed fluid-tight to a stator core 120, thus protecting the stator winding 121 fluid-tight.

Next, numeral 136 designates a front bracket, which supports the stator core 120, in which a cylindrical projection 134a at the end section of the enclosing member 134 is fitted in an annular groove 136a, and sealed fluid-tight with a gasket 137 made of viscous silicone or other; and a coolant passageway 142a is formed in the circumferential direction between an inside wall and the back side of the enclosing member 134. This front bracket 136 is provided with a coolant inlet pipe 138 and outlet pipe 139, and a partition section 136b is provided between the front bracket 136 and the back surface of the enclosing member 134 in a position between these pipes. Numeral 145 is a tube connected between the supply side of the coolant circulation system of engine for motor vehicles and the inlet pipe 138, and numeral 146 designates a tube connected to the outlet tube 139 to return the coolant to the return side of the above-mentioned coolant circulation system. Numeral 140 is a rear bracket which is connected fluid-tight to the front bracket 136 through an O-ring 141, with the cylindrical projection 134a of the enclosing member 134 fitted in the annular groove 140a and sealed fluid-tight by the viscous gasket 137. The rear bracket 140 secures the fixed core on the exciting side 133, at the same time supports the bearing 125, and is provided with a coolant branching port 140c and a return port 140d. Between the inside wall of the rear bracket 140 and the back surface of the enclosing member 134 on the rear side, a coolant passageway 142b is formed in the circumferential direction, and a partition section 140b is provided to separate into an inlet side and an outlet side.

Numeral 143 is a cooling cover produced of a metallic material of good heat conduction and mounted fluid-tight at the outer end of the rear bracket 140, with a coolant branch passageway 142c formed between them to flow the coolant from the branching port 140c and return from the return port 140d to a halfway part of the passageway 142b. On the outer end of the cooling cover 143 is secured the rectifier 126 through a heat sink 126a, and a voltage regulator 127 is secured through a heat sink 127a. Numeral 119b denotes good heat conductors formed integral with a spool 119a wound with the exciting winding 119, each fixed on the core 133 on the exciting side, at equal intervals at three places on the circumference. Their one end is disposed in the branch passageway 142c.

Numeral 144 designates a protective cover mounted on the rear bracket 140.

The cooling operation of the aforementioned embodiment is as follows. The low-temperature coolant for automotive engines is partly branched off, flowing from the inlet pipe 138 into the passageway 142a, 142b in the direction of the arrow while cooling the stator core 120 and the stator winding 121 and accordingly increasing in temperature. The coolant then goes out at the outlet pipe 139, returning to the return side of the coolant circulation system of the engine.

The coolant that has entered the passageway 142b through the inlet pipe 138 partly flows from the branching port 140c into the branch passageway 142c as indicated by the arrow while cooling the rectifier 126 and the voltage regulator 127 through the cooling cover 143, returning to the halfway part of the passageway 142b.

Furthermore, the front bracket 136 directly cooled effectively with the coolant absorbs the heat to cool the bearing 124, while the rear bracket 140 absorbs the heat to cool the bearing 125 and the exciting winding 119 through the core 133 on the exciting side. In addition, since one end of the good heat conductor 119b which is formed integral with the spool 119b wound with the exciting winding 119 is disposed in the above-described branch passageway 142c, the heat conduction efficiency can be improved with an increase in the heat dissipation surface area, thereby further accelerating heat absorption and cooling of the exciting winding 119.

Accordingly, the stator winding 120, the rectifier 126, the voltage regulator 127 and the exciting winding 119 which are likely to generate much heat, are effectively cooled, and therefore their temperature rise can be considerably restrained, and particularly the cooling of the exciting winding 119 can be done effectively, with the result that the exciting current will not largely decrease and the output current will not considerably decrease.

Figure 24:
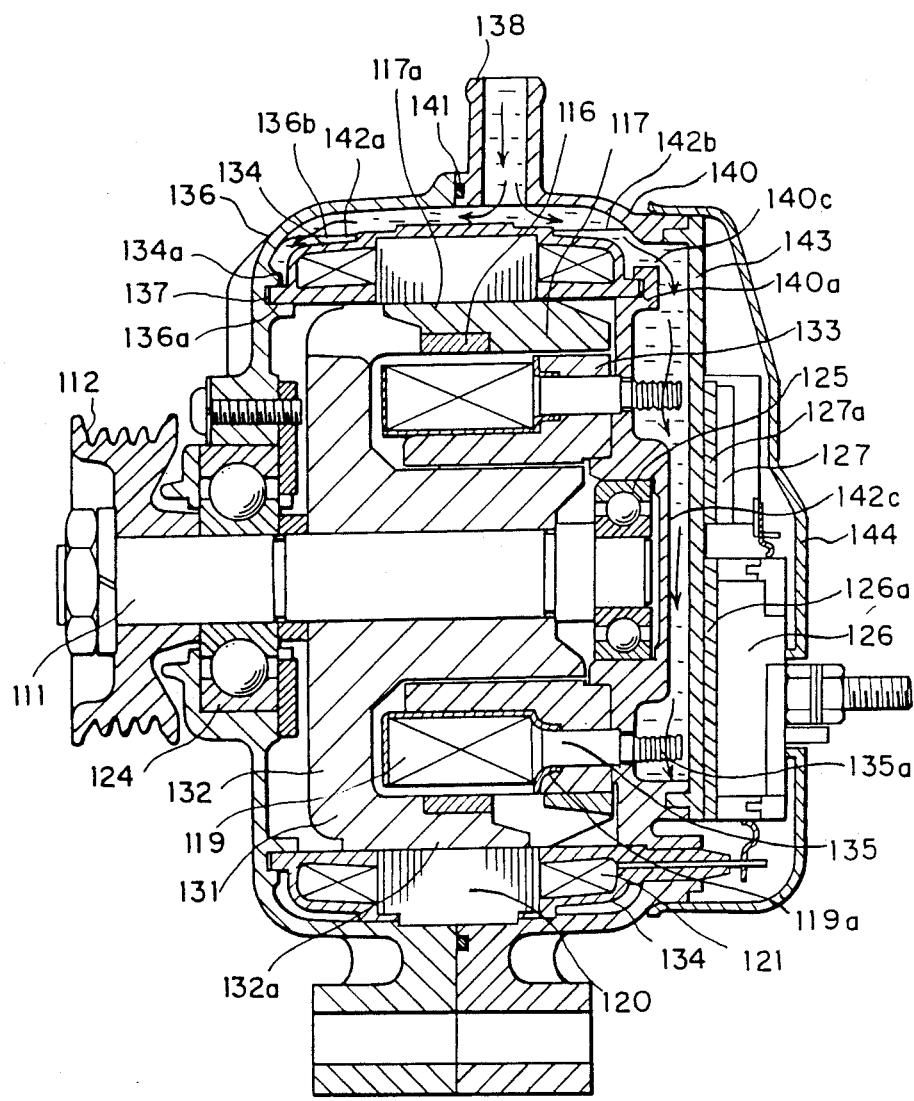
FIG. 24 is a sectional view showing a nineteenth embodiment of the present invention.
Figure 25:
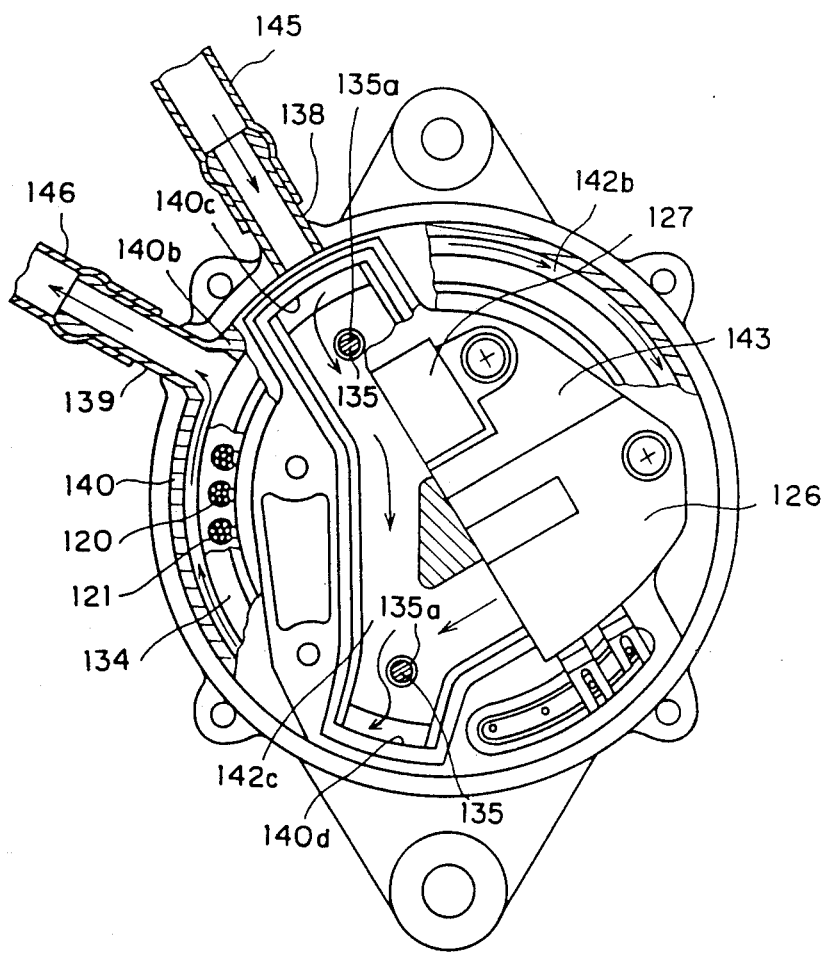
FIG. 25 is a front view, partly broken, of the nineteenth embodiment exclusive of the protective cover.

In the example described above, the good heat conductor formed integral with the spool 119a has been explained, but the good heat conductor may be separately installed to the spool 119a as shown in FIGS. 24 and 25.

FIGS. 24 and 25 show the nineteenth embodiment of the present invention. In FIGS. 24 and 25, numeral 135 is a good heat conductor for connecting the core 133 on the exciting side and the spool 119a wound with the exciting winding 119 in a state of good heat conduction. There are provided three good heat conductors at equal intervals on the circumference, one end of each of which is constituted as a heat-dissipating fin 135a disposed in the branch passageway 142c.

According to this embodiment, since the spool 119a and the good heat conductor 135 can be separately constituted, the spool 119a may be produced of resin which is a non-magnetic insulator and the good heat conductor 135 may be constituted of a metal such as aluminum; therefore it has become unnecessary to install a non-magnetic insulation member to the spool 119a.

Furthermore, in the above-mentioned embodiments, the coolant is partly branched off from the coolant circulation system of engine and circulated to the generator, but the present invention is not to be limited thereto, but a coolant circulating means of a separate system may be provided.

What is claimed is:

1. A rotating electric machine, comprising: revolving-field poles which are driven by an engine and excited by supplying the electric current to field windings; an armature core mounted in an armature winding; field cores mounted in said field windings; and a cylinder block with said armature core and field cores directly mounted thereto, and with a coolant passageway on the armature core side and a coolant passageway on the field core side formed therein for the circulation of a coolant in the coolant circulation system of said engine.

2. A rotating electric machine as claimed in claim 1, wherein heat pipes are arranged on said field cores and a part of said heat pipes are inserted in a coolant passageway on the field core side.

3. A rotating electric machine as claimed in claim 1, wherein heat pipes are arranged on said field cores, a part of said heat pipes are inserted in the coolant passageway on the field core side, and fins are provided at the inserted portion of said heat pipes.

4. A rotating electric machine as claimed in claim 1, wherein a pulley is mounted on a revolving shaft which is integral with said revolving-field poles.

5. A rotating electric machine, comprising: a rotating electric machine body which has field cores wound with a field winding for exciting, by supplying the electric current, the revolving-field poles mounted on the engine crankshaft, and an armature winding, such that, when the engine is started, said field windings and said armature winding may be excited by the electric current supplied from a battery, the engine may be started by turning a crankshaft with a torque produced at said revolving-field poles, and, after the engine is started, the machine may operate as a generator to charge the battery; and a cylinder block in which said field cores and armature core are directly mounted, and a coolant passageway on the armature core side and a coolant passageway on the field core side which communicate with the coolant circulation system of engine are formed to lead in the coolant.

6. A rotating electric machine as claimed in claim 5, wherein a clutch is provided for the interruption of power transmission between said crankshaft and a transmission drive shaft.

7. A rotating electric machine, comprising: revolving-field poles which are driven by the engine and excited by the electric current supplied to field windings; a field core wound with said field winding; a cylinder block on which an armature core and said field cores are directly mounted; and heat pipes whose one end is installed directly to, or in the vicinity of, said armature core or said armature coil, and whose other end is inserted in the coolant circulation system of said cylinder block.

8. A rotating electric machine as claimed in claim 7, wherein a fin is provided on the portion of said heat pipes is inserted into said coolant circulation system.

9. A rotating electric machine, comprising: a rotating electric machine body which has field cores wound with a field winding for exciting, by supplying the electric current, the revolving-field poles mounted on the engine crankshaft, and an armature winding, such that, when the engine is started, said field windings and said armature winding may be excited by the electric current supplied from a battery, the engine may be started by turning a crankshaft with a torque produced at said revolving-field poles, and, after the engine is started, the machine may operate as a generator to charge said battery; a cylinder block having an inlet passageway and a discharge passageway which communicate with the coolant circulation system of said engine; and a bracket with said armature core and said field cores fitted thereon and having a coolant passageway so formed in the vicinity of said armature winding and field windings that the engine coolant circulating in said coolant circulation system of engine will be led in from said inlet passageway and returned again from said discharge passageway into the return side of said coolant circulation system of engine.

10. A rotating electric machine as claimed in claim 9, wherein said bracket is produced of a good heat-conduction material.

11. A rotating electric machine as claimed in claim 9, wherein said coolant passageways have inlet ports each communicating with said coolant circulation system of engine, and are mounted independently on the armature core side and the field core side to said bracket.

12. A rotating electric machine as claimed in claim 9, wherein said independent coolant passageways return the coolant directly to the return side of said coolant circulation system of engine through a common discharge port.

13. A rotating electric machine as claimed in claim 9, wherein the end of said coolant passageway on the field core side and the end of said coolant passageway on the armature core side, which are independent of each other, are communicating to lead the coolant from the supply side of said coolant circulation system of engine through the inlet port provided in the coolant passageway on the field core side, thus leading the coolant from said coolant passageway on the field core side to said coolant passageway on the armature core side.

14. A rotating electric machine as claimed in claim 9, wherein the coolant on the supply side of the coolant circulation system of engine that has flowed in at the inlet port, joins after being divided to the right and left by the coolant passageway on the field core side, and joins again after being divided to the right and left by said coolant passageway on the armature core side, returning to the return side of said coolant circulation system of engine.

15. A rotating electric machine as claimed in claim 9, wherein the coolant in the coolant passageway on the field core side absorbs the heat of said field core through heat pipes.

16. A rotating electric machine as claimed in claim 9, wherein said coolant passageways are formed in a common bracket without separating into said armature core side and said field core side.

17. A rotating electric machine, comprising: a rotating electric machine body which has field cores wound with a field winding for exciting, by supplying the electric current, the revolving-field poles mounted on the engine crankshaft, an armature cores wound with armature windings, such that, when the engine is started, said field windings and said armature winding may be excited by the electric current supplied from a battery, the engine may be started by turning a crankshaft with a torque produced at said revolving-field poles, and, after the engine is started, the machine may operate as a generator to charge said battery; a cylinder block having an inlet passageway and discharge passageway which communicate with the coolant circulation system of said engine; a bracket with said armature core and said field cores fitted thereon and mounted on said cylinder block and having a coolant passageway so formed in the vicinity of said armature winding and field windings that the engine coolant circulating in said coolant circulation system of said engine will be led in from said inlet passageway and returned again from said discharge passageway into the return side of said coolant circulation system of engine; a clutch which interrupts the transmission of power between said crankshaft and a transmission drive shaft; and heat pipes mounted in the vicinity of a clutch disc connection area in said revolving-field poles for the dissipation of heat of said revolving-field poles.

18. A rotating electric machine as claimed in claim 17, wherein said heat pipe is provided with a plurality of disc-shaped fins on the outer peripheral surface.

19. A rotating electric machine, comprising: a rotating electric machine body which has field cores wound with a field winding for exciting, by supplying the electric current, the revolving-field poles mounted on the engine crankshaft, such that when the engine is started, said field windings and said armature winding may be excited by the electric current supplied from a battery, the engine may be started by turning a crankshaft with a torque produced at said revolving-field poles, and, after the engine is started, the machine may operate as a generator to charge said battery; a cylinder block having an inlet passageway and a discharge passageway which communicate with the coolant circulation system of said engine; a bracket with said armature core and said field cores fitted thereon and mounted on said cylinder block; and heat pipes with their one end disposed each directly to, or in the vicinity of, said armature core or said armature coil, and with their other end inserted in said coolant circulation system of said cylinder block.

20. A rotating electric machine as claimed in claim 19, wherein the portion of said heat pipes that is inserted in said coolant circulation system is provided with a fin.

21. A rotating electric machine, comprising: a rotating electric machine body which has field cores wound with a field winding for exciting, by supplying the electric current, the revolving-field poles mounted on the engine crankshaft, and armature cores wound with an armature winding such that when the engine is started, said field winding and said armature winding may be excited by the electric current supplied from a battery, the engine may be started by turning a crankshaft with a torque produced at said revolving-field poles, and, after the engine is started, the machine may operate as a generator to charge said battery; a cylinder block having an inlet passageway and a discharge passageway which communicate with said coolant circulation system of engine; a bracket with said armature core and said field cores fitted thereon, and mounted on said cylinder block; and a coolant passageway communicating with said engine coolant passageway and enclosing said armature winding.

22. A rotating electric machine as claimed in claim 21, wherein heat pipes are arranged with their one end disposed on the field core and their other end positioned in the engine coolant passageway.

23. A rotating electric machine as claimed in claim 21, wherein a heat-dissipation member of good heat conduction is arranged with its one end disposed on the field core and its other end positioned in said coolant passageway of engine.

24. A rotating electric machine, comprising: a rotor pole core which is fixedly mounted on a revolving shaft driven by an engine and excited by the electric current flowing through an excitation winding; a stator core surrounding said pole core and wound with a stator winding; a front bracket and a rear bracket which respectively support said stator core and said revolving shaft through bearings; a pair of enclosing members on both sides which enclose fluid-tight both ends of said stator winding; a coolant passageway formed in the circumferential direction between the inside wall of said front bracket connected fluid-tight in the inside section with the outer end section of one of said enclosing members and the back surface of said enclosing member; a coolant passageway which is formed in the circumferential direction between the inside wall of said rear bracket connected fluid-tight, in the inside section, to the outer end section of said other enclosing member, and said enclosing member; a cooling cover in which a branch passageway which is mounted fluid-tight in the outer end section of said rear bracket and branches to flow the coolant from the passageway in said rear bracket, thus forming the branch passageway therebetween; a rectifier and a voltage regulator which are secured on said cooling cover; and a good heat conductor provided on a spool which is wound with said exciting winding with its one end inserted in said branch passageway.

25. A rotating electric machine as claimed in claim 24, wherein the coolant is partly branched off from said coolant circulation system of engine to flow into said passageway.

26. A rotating electric machine as claimed in claim 24, wherein a heat-dissipating fin is provided on the end on the branch passageway of said good heat conductor.

* * * * *